(12) United States Patent
Willey et al.

(10) Patent No.: US 7,226,100 B1
(45) Date of Patent: Jun. 5, 2007

(54) VEHICLE BED EXTENDER

(75) Inventors: Kent A. Willey, Capistrano Beach, CA (US); Matthew J. Boland, San Juan Capistrano, CA (US); Jaime J. Berndt, Oceanside, CA (US)

(73) Assignee: BOZ Design, LLC, Newport Beach, CA (US)

( * ) Notice: Subject to any disclaimer, the term of this patent is extended or adjusted under 35 U.S.C. 154(b) by 31 days.

(21) Appl. No.: 11/169,400

(22) Filed: Jun. 28, 2005

(51) Int. Cl.
*B62D 33/03* (2006.01)

(52) U.S. Cl. .................................. 296/26.11
(58) Field of Classification Search ............ 296/26.01, 296/26.08, 26.11
See application file for complete search history.

(56) References Cited

U.S. PATENT DOCUMENTS

| | | |
|---|---|---|
| 1,838,344 A | 12/1931 | Wilson |
| 4,451,075 A | 5/1984 | Canfield |
| 4,472,639 A * | 9/1984 | Bianchi .................. 296/26.11 |
| 4,531,773 A | 7/1985 | Smith |
| 4,573,730 A | 3/1986 | Gondert et al. |
| 4,596,417 A | 6/1986 | Bennett |
| 4,749,226 A | 6/1988 | Heft |
| 4,750,773 A | 6/1988 | Chapline et al. |
| 4,778,213 A | 10/1988 | Palmer |
| 4,828,312 A | 5/1989 | Kinkel et al. |
| 4,938,398 A | 7/1990 | Hallsen |
| 5,154,470 A | 10/1992 | Bringman, Jr. |
| 5,167,363 A | 12/1992 | Adkinson et al. |
| 5,207,469 A | 5/1993 | Rossi |
| 5,456,511 A | 10/1995 | Webber |
| 5,468,038 A | 11/1995 | Sauri |
| 5,570,921 A | 11/1996 | Brooker |
| 5,678,743 A | 10/1997 | Johnson et al. |
| 5,700,047 A | 12/1997 | Leitner et al. |
| 5,752,636 A | 5/1998 | Manley |
| 5,752,800 A | 5/1998 | Brincks et al. |
| 5,755,480 A | 5/1998 | Bryan |
| 5,765,892 A | 6/1998 | Covington |
| 5,775,759 A | 7/1998 | Cummins |
| 5,806,907 A * | 9/1998 | Martinus et al. .......... 296/26.11 |
| 5,816,638 A | 10/1998 | Pool, III |
| 5,820,188 A | 10/1998 | Nash |
| 5,823,596 A | 10/1998 | Kulesza |
| 5,823,597 A | 10/1998 | Anderson |
| 5,853,116 A | 12/1998 | Schreiner |
| 5,857,724 A | 1/1999 | Jarman |
| 5,868,449 A | 2/1999 | Hitchcock |
| 5,902,000 A | 5/1999 | Wold |
| 5,911,464 A * | 6/1999 | White .................... 296/26.11 |
| 5,918,925 A | 7/1999 | Perrin |
| 5,924,753 A | 7/1999 | DiBassie |
| 5,997,066 A | 12/1999 | Scott |
| 6,007,127 A | 12/1999 | Garofalo |
| 6,019,410 A | 2/2000 | Trostle et al. |
| 6,053,553 A | 4/2000 | Hespelt |
| 6,070,926 A | 6/2000 | Hardin |

(Continued)

*Primary Examiner*—Dennis H. Pedder
(74) *Attorney, Agent, or Firm*—Blakely Sokoloff Taylor & Zafman LLP

(57) ABSTRACT

An apparatus comprising a plurality of rotationally coupled panels that are capable of being configured from a vehicle bed extender to a storage container to a planar configuration to a stack that may optionally be stored behind a seat in a cab of a truck. Methods of making and using the apparatus are also disclosed.

2 Claims, 18 Drawing Sheets

U.S. PATENT DOCUMENTS

| | | |
|---|---|---|
| 6,113,173 A | 9/2000 | Leitner et al. |
| 6,120,076 A | 9/2000 | Adsit et al. |
| 6,155,622 A | 12/2000 | Reed |
| 6,170,724 B1 | 1/2001 | Carter et al. |
| 6,174,012 B1 | 1/2001 | Saffold |
| 6,179,360 B1 * | 1/2001 | Davian .................... 296/50 |
| 6,186,575 B1 | 2/2001 | Fisher et al. |
| 6,189,458 B1 | 2/2001 | Rivera |
| 6,193,294 B1 | 2/2001 | Disner et al. |
| 6,199,894 B1 | 3/2001 | Anderson |
| 6,213,530 B1 | 4/2001 | Bohannon |
| 6,234,733 B1 | 5/2001 | Parr |
| 6,279,980 B1 | 8/2001 | Straschewski |
| 6,283,525 B1 | 9/2001 | Morse |
| 6,296,289 B1 | 10/2001 | Gehring et al. |
| 6,322,125 B2 | 11/2001 | Bauer |
| 6,343,826 B2 | 2/2002 | Bohannon |
| 6,367,858 B1 | 4/2002 | Bradford |
| 6,378,926 B1 * | 4/2002 | Renze et al. .............. 296/26.11 |
| 6,402,215 B1 | 6/2002 | Leitner et al. |
| 6,425,618 B1 | 7/2002 | Garland et al. |
| 6,513,688 B2 | 2/2003 | Kmita et al. |
| 6,536,826 B1 | 3/2003 | Reed |
| 6,540,123 B1 | 4/2003 | Kmita et al. |
| 6,550,836 B2 | 4/2003 | Rigau |
| 6,550,841 B1 | 4/2003 | Burdon et al. |
| 6,554,340 B1 | 4/2003 | Stevenson |
| 6,557,918 B2 | 5/2003 | Iafrate et al. |
| 6,561,560 B2 | 5/2003 | Brown et al. |
| 6,561,561 B2 | 5/2003 | Getzschman et al. |
| 6,598,922 B2 | 7/2003 | Morse et al. |
| 6,609,743 B1 | 8/2003 | Stevenson |
| 6,623,059 B2 | 9/2003 | Gehring et al. |
| 6,626,478 B1 | 9/2003 | Minton |
| 6,676,182 B2 | 1/2004 | Fitts |
| 6,676,185 B2 | 1/2004 | Gehring et al. |
| 6,779,956 B2 | 8/2004 | Strumolo et al. |
| 6,805,392 B2 * | 10/2004 | Leitner et al. ........... 296/26.08 |
| 2001/0050490 A1 | 12/2001 | De Gaillard |
| 2002/0096901 A1 | 7/2002 | Iafrate et al. |
| 2002/0101088 A1 | 8/2002 | Rigau |
| 2002/0153737 A1 | 10/2002 | Fitts |
| 2002/0190536 A1 | 12/2002 | Getzschman et al. |

* cited by examiner

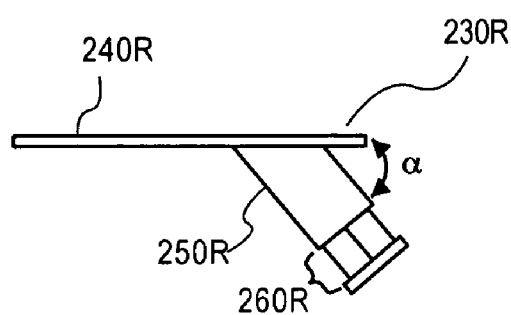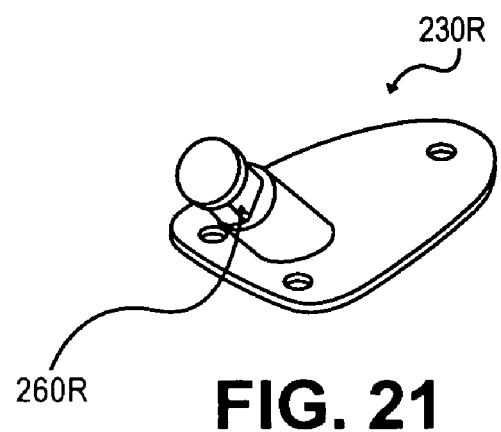
FIG. 20  FIG. 21

VEHICLE BED EXTENDER

BACKGROUND

1. Field

Vehicle bed extenders and storage systems.

2. Background

Various truck bed extenders, their characteristics, and their uses have been discussed in the literature. Representative examples of truck bed extenders are discussed in U.S. Pat. Nos. 6,561,560; 6,557,918; 6,279,980; 5,700,047; and 4,472,639.

U.S. Pat. No. 6,561,560 discusses various vehicle cargo area extenders. In part, the '560 patent discusses a vehicle cargo area extender including a pair of sidewalls, a center wall extending between the pair of sidewalls and a lid removably disposed relative to the pair of sidewalls and the center wall. The sidewalls, the center wall and the lid cooperate to define an enclosure having an open end. The vehicle cargo area extender is moveably mounted between a stored position relative to a vehicle cargo area wherein the open end of the enclosure is adjacent to the rear wall of the vehicle cargo area and a deployed position so as to be supported by the rear wall of the vehicle cargo area when it is in its extended position such that the open end of the enclosure faces the vehicle cargo area thereby increasing the effective size of the vehicle cargo area.

BRIEF DESCRIPTION OF THE DRAWINGS

Embodiments may best be understood by referring to the following description and accompanying drawings that are used to illustrate the claims. In the drawings:

FIG. 20 shows a side view of an embodiment of a mounting post assembly that may be connected to a panel of a VBE/SD and used to connect the VBE/SD to a vehicle.

FIG. 21 is a top perspective view of the mounting post assembly of FIG. 20.

DETAILED DESCRIPTION

In the following description, numerous specific details are set forth. However, it is understood that embodiments may be practiced without these specific details. In other instances, well-known structures and techniques have not been shown in detail in order not to obscure the understanding of this description.

Pickup trucks, and certain other vehicles, have cargo areas that may be used to haul and store items. The vehicle typically includes a cab having a seat where the operator of the vehicle may sit. Some vehicles have a generally limited amount of space behind the seat that may be used for storage (e.g., six to 24 inches). The vehicle typically also has a separate cargo area that is disposed adjacent to and behind the cab. The cargo area may be defined, at least in part, by a horizontal bed, a front vertical wall nearest the cab, and by a pair of upstanding vertical sidewalls that are spaced apart from one another on opposite sides of the bed. The vehicle typically includes a rear wall or tailgate that may extend between the pair of sidewalls at the back end of the bed, which is farthest from the cab. The tailgate is generally rotationally connected to the bed, such as, for example by one or more hinges, so that it may be rotated from an upright position to an extended position. An extended tailgate is sometimes referred to as open or down. The extended tailgate may have a position that is substantially co-planar with the bed of the vehicle. An upright tailgate may have a position that is substantially perpendicular to the bed and disposed and secured between the pair of sidewalls. When in the upright position, the inner portions (walls) of the tailgate, the sidewalls, and front wall may define a perimeter of the cargo area of the vehicle. This perimeter may help to hold items in the cargo area while the vehicle is moving and stopping.

Sometimes more cargo area may be useful, such as, for example, in order to haul bigger items and/or more items. Sometimes it may also be useful to provide more protection for tools and other items included in the cargo area of the vehicle.

Figure 1:
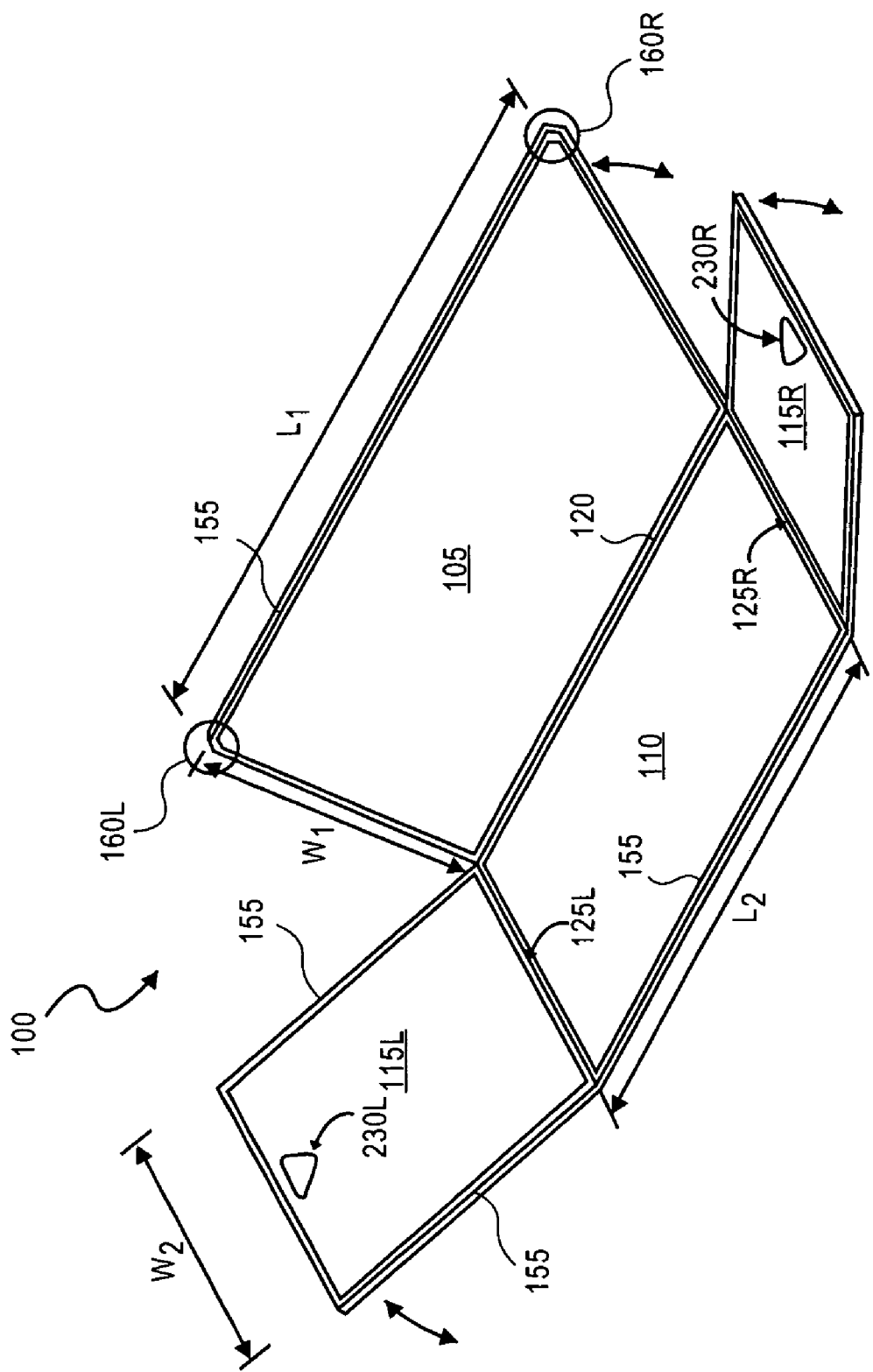
FIG. 1 shows an top view of an embodiment of a vehicle bed extender and storage device (VBE/SD) for a vehicle, according to one or more embodiments of the invention.

FIG. 1 is a top perspective view of one embodiment of a vehicle bed extender and storage device (VBE/SD) for a vehicle. The perspective view shows the VBE/SD 100 in a non-use configuration, which reveals many of the components and their connections.

VBE/SD 100 includes first panel 105. In this embodiment, first panel 105 is the largest panel. As shown, first panel 105 may optionally have a trapezoidal shape, for reasons that will be discussed further below. According to this trapezoidal shape, first panel 105 may have a shorter edge and a longer edge that are parallel to and opposing one another.

VBE/SD 100 also includes second panel 110 that is connected to the shorter edge of first panel 105. In the illustrated embodiment, second panel 110 is the second largest panel, although this is not required. In this embodiment, second panel 110 has a rectangular shape. Rectangular second panel 110 has a pair of parallel and opposing longer edges and a pair of parallel and opposing shorter edges. A longer edge of second panel 110 is moveably and rotatably connected to the shorter of the parallel edges of first panel 105 at first axis 120. An arrow is used to show a possible direction of rotation. As shown, the connected edges of first panel 105 and second panel 110 may have about the same length although, in some embodiments, as described below, the edge of second panel 110 may be longer.

VBE/SD 100 also includes right panel 115R and left panel 115L. In the illustrated embodiment, right panel 115R and left panel 115L are about equal in size, and are slightly smaller than second panel 110, although this is not required. Right panel 115R and left panel 115L have rectangular shapes. Each of right panel 115R and left panel 115L has a pair of parallel and opposing longer edges and a pair of parallel and opposing shorter edges. In another embodiment, the rectangular shape includes a square shape with adjacent edges having approximately the same length. An edge of right panel 115R is rotatably connected with a shorter edge of second panel 110 at right axis 125R, and an edge of left panel 115L is rotatably connected to the other shorter edge of second panel 110 at left axis 125L. Arrows are used to show possible directions of rotation. As shown, the connected edges of right panel 115R or left panel 115L may have about the same length.

Suitable materials for the panels include, but are not limited to, metal, such as, for example, stainless steel or aluminum alloy; plastic, such as, for example, polyethylene or polypropylene or a combination of monomers/polymers; fiberglass; wood; and the like. Combinations of materials may also optionally be used. In terms of plastic materials, the panels may be formed, in one embodiment, by molding techniques.

Different approaches to moveably and rotatably connecting the edges of the panels at axes are contemplated. One approach is to use hinges, such as, for example, piano hinges that may extend approximately the length of an edge and hinge in such a manner that the panels between a hinge can fold flat against one another.

Figure 2:
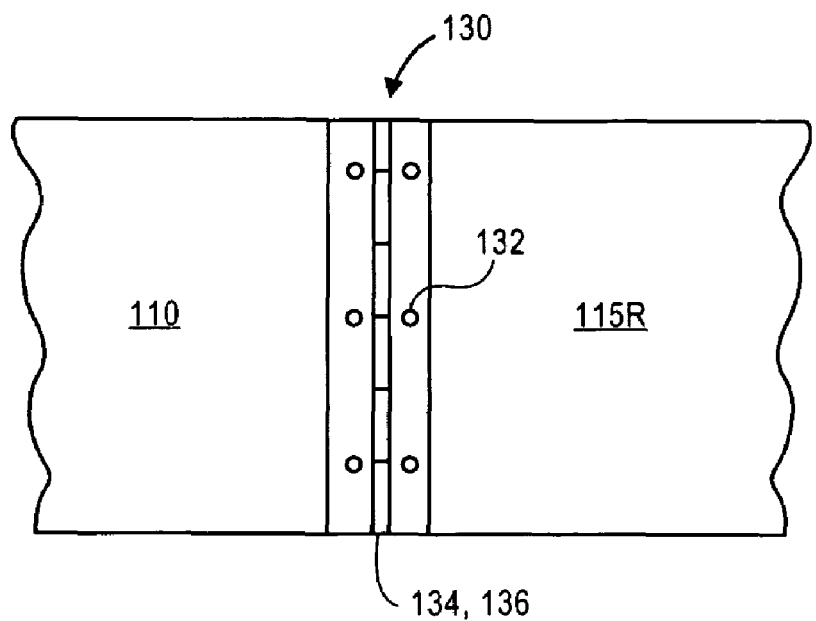
FIG. 2 shows a side view of two connected panels of a VBE/SD in an embodiment where hinges may be used to rotationally connect the panels.

FIG. 2 shows, by way of example, how right panel 115R may be rotationally connected with second panel 110 by piano hinge 130. As shown, piano hinge 130 may be disposed between the edges of first panel 110 and right panel 115R and may be connected with each of second panel 110 and right panel 115R by fasteners 132, such as, for example, screws, bolts, rivots, or the like. Welding and other approaches may also optionally be used, particularly in the case of metal material for the panels and hinges. Representatively, piano hinge 130 may have relatively (e.g., 0.25 inches) thin pin joint 134 and pin 136 running the length of the joint that extends along substantially the full length of the edges. Piano hinge 130 may provide an axis of rotation that may optionally allow full back-to-back wrap-around rotation of second panel 110 and right panel 115R relative to one another.

Figure 3:
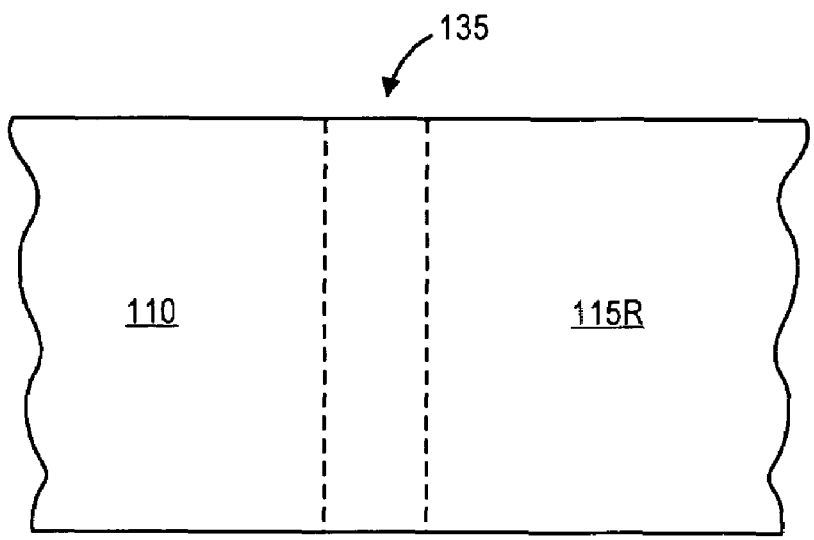
FIG. 3 shows a side view of two connected panels of a VBE/SD in an embodiment where plications may be used to rotationally connect the panels.

Another approach to rotationally connect adjacent panels is to use a plication to form a living hinge. FIG. 3 shows, by way of example, how right panel 115R may be rotationally coupled with the second panel 110 by plication 135. Representatively, second panel 110 and right panel 115R may be formed from a single piece of pliable material, such as, for example, plastic, that has a portion (at the hinge or designated divide between second panel 110 and right panel 115R) supple enough to bend freely and/or repeatedly without breaking. Plication 135 may be formed in the single piece of material, without cutting or otherwise severing the panels from one another, such as, for example, by folding, compression, weakening, material thinning or otherwise known ways of forming plications.

In one or more embodiments, a method of forming a VBE/SD may include cutting a single piece of plastic or other pliable material to shape, and then forming plications at the above-described axes of rotation. In one embodiment, a VBE/SD may be formed with a combination of plications and hinges.

Yet another approach is to connect or otherwise include a bendable material between the edges. Suitable bendable materials include, but are not limited to, rubbers, cloths, and certain plastics. The bendable material may be stapled, glued, or otherwise adhered or fastened to the panels.

Figure 4:
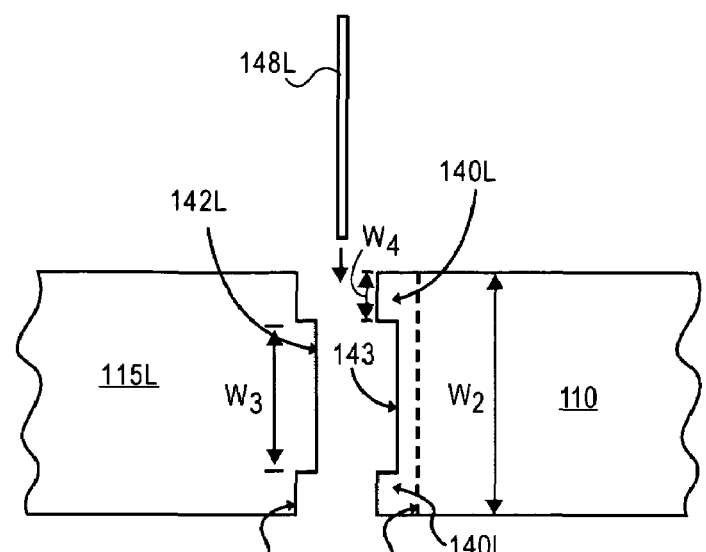
FIG. 4 shows an exploded side view of two connected panels of a VBE/SD in another embodiment using a hinge to rotationally connect the panels, mating portions of the hinges formed in the edges of the panels.
Figure 5:
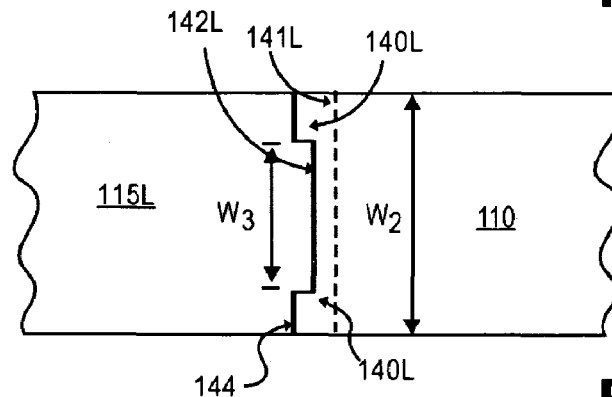
FIG. 5 shows a side view of the two connected panels of FIG. 4.
Figure 6:
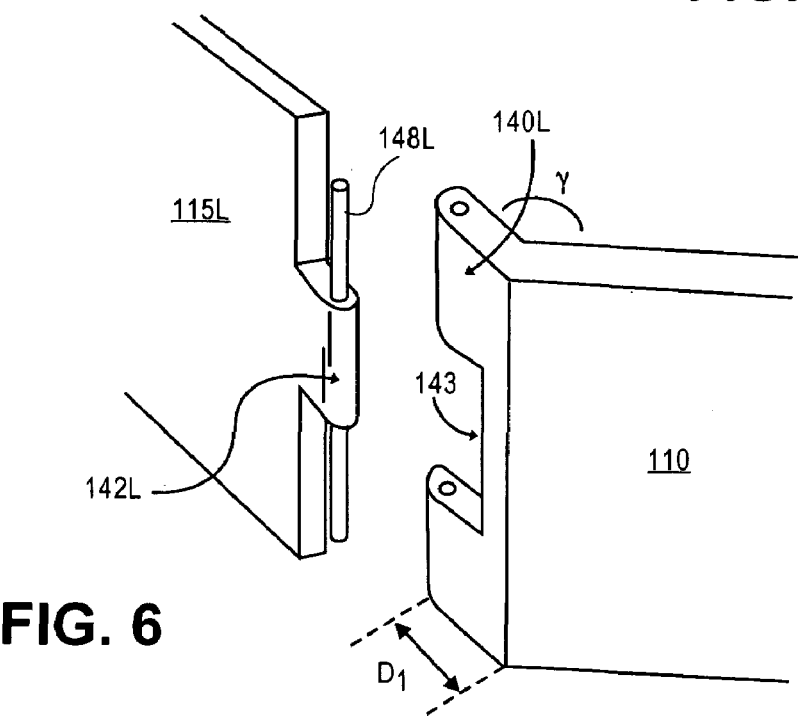
FIG. 6 shows an exploded top left perspective view of the two panels of FIG. 4.

FIGS. 4–7 show another example of how panels may be rotationally connected to one another. FIGS. 4–6 show the connection between left panel 115L and second panel 110. In this example, left panel 115L includes a protrusion extending from edge 142L and second panel 110 includes two protrusions 140L extending from edge 141L opposed to edge 142L of left panel 115L. FIGS. 4–6 show that protrusions 140L are part of ledge 143L that bends at edge 141L to define an angle γ between second panel 110 and ledge 143L. In one embodiment, a representative angle γ ranges from 90° to 165°, e.g., 105° to 135°. In one embodiment, ledge 143L may serve to position an axis of connection between second panel 110 and left panel 115L a distance away from edge 141L. This may facilitate the stacking of left panel 115L and right panel 115R on second panel 110 when VBE/SD 10 is in a stacked or storage configuration as described in FIGS. 8–10. FIG. 6 shows protrusion 142L extending in the same plane as an edge of left panel 115L. A width, $W_3$, of protrusion 142L and width, $W_4$, of protrusions 140L may vary as may the number of protrusions. For example, the width dimension of the combination of protrusion 140L and protrusions 142L collectively extend a width equivalent to a width, $W_2$, of second panel 110 or right panel 115R.

When ledge 143L of second panel 110 is aligned (widthwise alignment) with edge 144L of left panel 115L, protrusions 140 and protrusion 142 are offset relative to one another so that the protrusions do not overlap or contact when edge 141L and edge 143L are brought together. Protrusions 140 each include a widthwise opening that are aligned with one another; protrusion 142 also includes a widthwise opening therethrough. The openings in protrusions 140L and through protrusion 142L, in one embodiment, have approximately the same diameter. When ledge 143L of second panel 110 is aligned with edge 114L, the openings in protrusions 140L and protrusion 142L may be aligned to allow pin 148L, having a diameter approximately equal to or less than the openings, to extend through the openings and connect second panel 110 to left panel 115L. Pin 148L defines axis 125L (see FIG. 1) through which left panel 115L can rotate relative to second panel 110.

Figure 7:
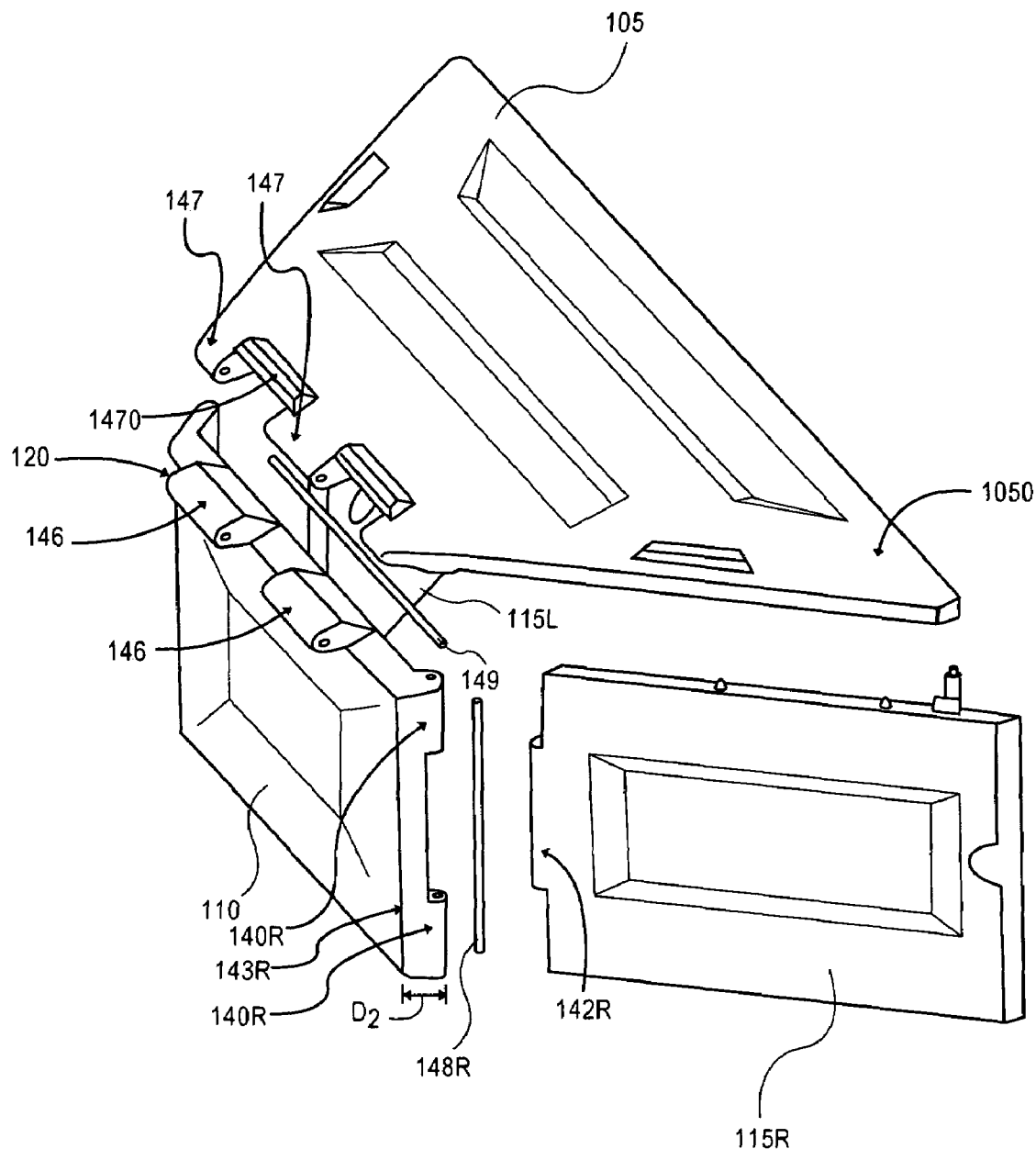
FIG. 7 shows an exploded top right perspective view of the two connected panels of FIG. 4 and including two additional connected panels.

FIG. 7 shows an exploded perspective view of the connection of first panel 105 to second panel 110, right panel 115R to second panel 110, and left panel 115L to second panel 110. The configuration and connection of each of first panel 105 and right panel 115R to second panel 110 may be similar to that described in FIGS. 4–6 with left panel 115L and second panel 110. FIG. 7 shows right panel 115R having protrusion 142R extending from an edge of right panel 115R. Protrusion 142R extends from an edge of right panel 115R in the same plane as the panel. FIG. 7 also shows second panel 110 having two protrusions 140R extending from ledge 143R. Ledge 143R bends at a right edge of second panel 110 to define an angle between second panel 110 and ledge 143R, in one embodiment, similar to angle γ between second panel 110 and ledge 143L. FIG. 7 also shows a length, $D_2$, of ledge 143R that is less than a length, $D_1$, of ledge 143L. The offset displacement offsets the axis of rotation of right panel 115R about second panel 110 (axis 125R, FIG. 1) and the axis of rotation of left panel 115L about second panel 110 (axis 125L, FIG. 1). This may facilitate stacking of right panel 115R and left panel 115L on second panel 110.

FIG. 7 also shows pin 148R that may be used to connect second panel 110 to right panel 115R. In the embodiment described, pin 148R extends through openings in protrusions 140R of second panel 110 and protrusion 142R of left panel 115L. Pin 148R defines axis 125R (FIG. 1) on which right panel 115R rotates about second panel 110.

FIG. 7 further shows a shorter edge of first panel 105 configured to have three protrusions 147 each having an aligned opening therein intended to mate with two protrusions 146 extending from a longer edge of second panel 110 and each having an aligned opening therein. Protrusions 147 mate with protrusions 146 through the extension of pin 149 through the aligned openings. In one embodiment, protrusions 146 extend out of the plane defined by a longer edge of second panel 110 so that openings in protrusions 146 (openings to define an axis of rotation of first panel 105 about second panel 110) are outside (e.g., behind a volume enclosed by second panel 110, right panel 115R and left panel 115L). In this manner, first panel 105 may be rotated about axis 120 to a point beyond the enclosed volume. FIG. 7 also shows two stops 1470 between protrusions 147 and extending from surface 1050 of first panel 105 (a top surface as viewed in FIG. 7 and a surface opposite the enclosed volume). Stops 1470 serve, in one embodiment, to limit the rotation of first panel 105 about axis 120 to a point where stops 1470 will contact second panel 110.

Figure 8:
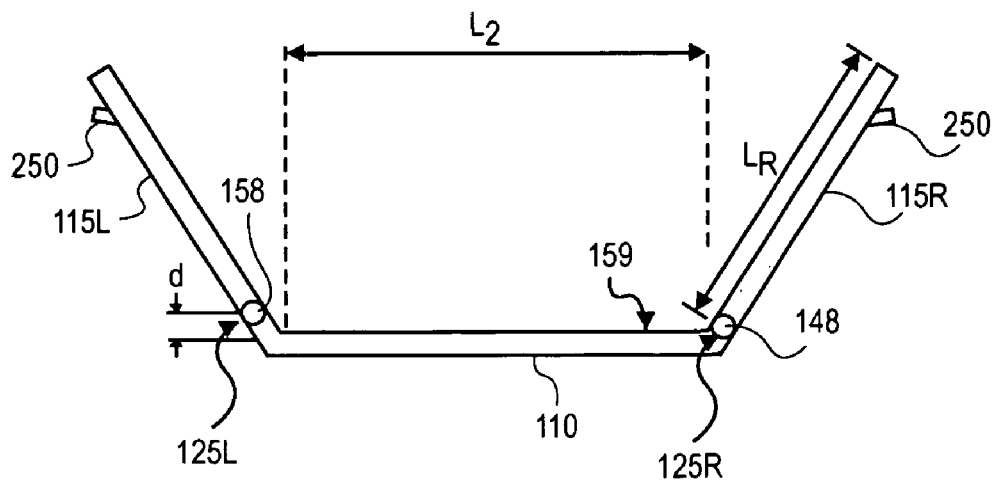
FIG. 8 shows a top view of three connected panels of a VBE/SD each panel connected to an adjacent panel through the hinge connection described with reference to FIGS. 4–7.
Figure 9:
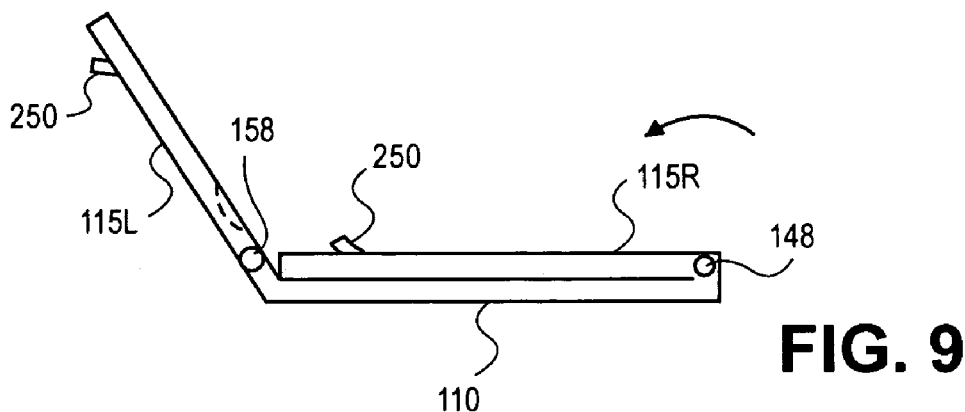
FIG. 9 shows the three connected panels of FIG. 8 after rotating a right panel (as viewed) so that it is in a stacked configuration with another panel.
Figure 10:
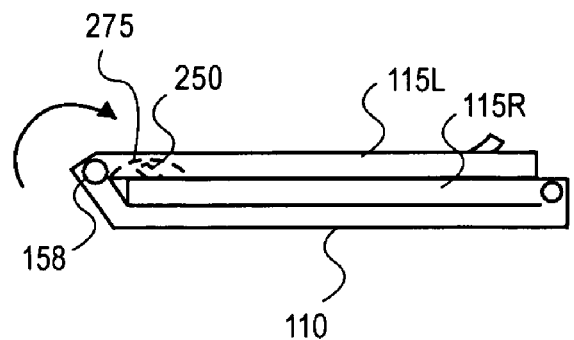
FIG. 10 shows the three connected panels of FIG. 9 after rotating a left panel (as viewed) so that it is in a stacked configuration with the right panel and the other panel.

FIG. 8 shows a top view of second panel 110 connected to right panel 115R and left panel 115L. Using the embodiment described with respect to FIGS. 4–7, FIG. 8 shows pin 148R at the junction of second panel 110 and right panel 115R defining axis 125R. A similar pin 148L designates the junction between second panel 110 and left panel 115L and defined axis 125L. As illustrated in FIG. 8, the second panel 110/right panel 115R junction (denoted by pin 148R) is at approximately or just above inner surface 159 of second panel 110. The second panel 110/left panel 115L junction (denoted by pin 148L) is a distance, d, from surface 159 of second panel 110. This distance is defined at least in part by distance, $D_1$, of ledge 143L (see FIG. 7). This distance, d, may be equivalent to a thickness of right panel 115R or slightly greater than a thickness of right panel 115R. Positioning of pin 148R (axis 125R) and pin 148L (axis 125L) may be accomplished by forming (e.g., molding in the case of plastic) second panel 110 to have left and possibly right edges that are non-linear or angled upward as viewed in FIG. 8. In one embodiment, an angle is selected to correspond to the desired projection of right panel 115R and left panel 115L from second panel 110 as described below. In this manner, in one embodiment, right panel 115R may be rotated counterclockwise to lie adjacent (e.g., in contact with) surface 159 of second panel 110 while left panel 115L may be rotated clockwise to lie adjacent to (e.g., in contact with) a surface of right panel 115R. This is illustrated in FIG. 9 and FIG. 10. As viewed, right panel 115R has a length dimension $L_R$ less than a length dimension, $L_2$, of second panel 110.

Other approaches may optionally be used. Combinations of approaches may also optionally be used.

The moveable connections described above allow VBE/SD 100 to be placed in different configurations. Several salient configurations will now be described.

A first configuration is an in-use vehicle bed extender configuration. In the vehicle bed extender configuration, the panels of VBE/SD 100 may cooperate to define a structure that may be used to extend a vehicle bed and/or cargo area.

A second configuration is an in-use storage device configuration. In the storage device configuration, the panels of VBE/SD 100 may cooperate to define a structure that may reside in the cargo area of the vehicle, and that may be used to store tools and/or other items. As will be disclosed below, VBE/SD 100 may be rotated between the first and second configurations.

A third configuration is a non-use stacked configuration. In the stacked configuration, the panels of VBE/SD 100 may be stacked relative to one another, such as, for example, by inward rotation or folding. The stacked configuration provides a relatively compact form that may tend to facilitate functions such as storage, handling, and/or shipping. In one or more embodiments, the stacked configuration may have a size and shape, especially a thickness, that may allow it to be placed and stored in a confined space within a cab of a vehicle, such as, for example, in the generally limited space in the cab of a truck behind the seats.

A fourth configuration where VBE/SD 100 may be arranged with multiple panels planarly aligned so that VBE/SD 100 may be used as a support structure such as a table top.

Figure 11:
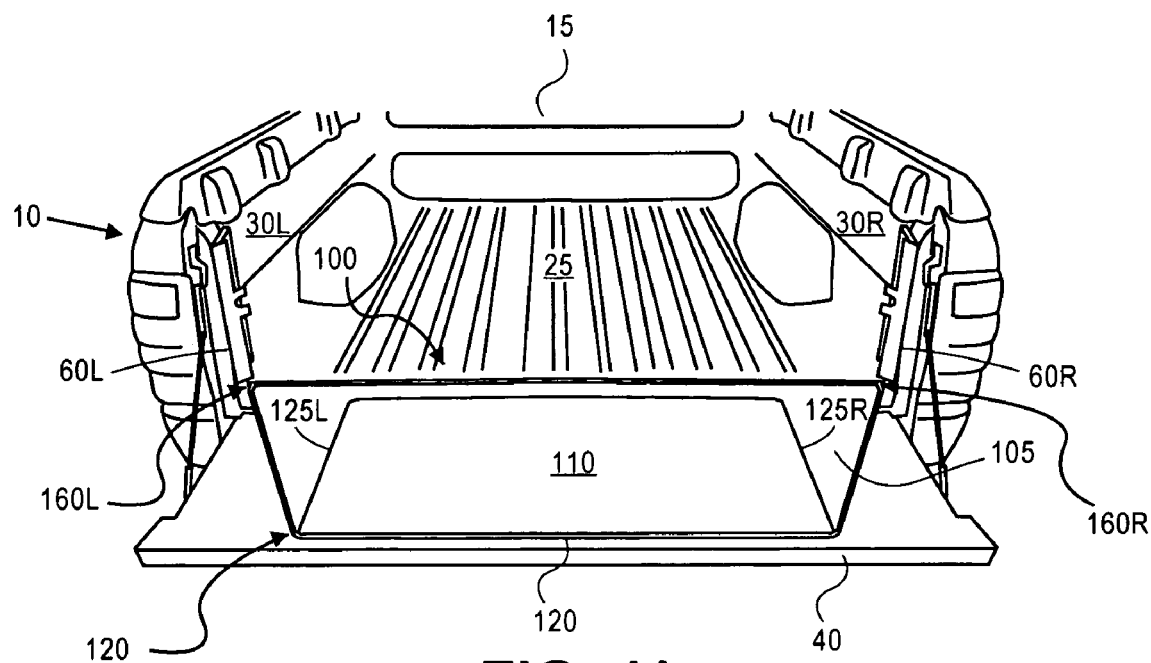
FIG. 11 shows an embodiment of a VBE/SD in a stacked configuration on a tailgate of a vehicle (truck).

FIG. 11 is a perspective view from the back of the vehicle that shows VBE/SD 100 in a stacked configuration. The stacked configuration is placed on, or otherwise over, tailgate 40 of vehicle 10 when tailgate 40 is in an extended position that is substantially coplanar with bed 25 of vehicle 10.

In the illustrated stacked configuration, first panel 105 is on the bottom and lies horizontally on, or otherwise over, extended tailgate 40. As viewed, first panel 105 has a front margin and edge that, as placed, lie closest to cab 15 of the vehicle and a back margin and edge that lie farthest from the cab.

It should be noted that terms such as "top", "bottom", "front", "back", and the like, are used herein only to facilitate the description of VBE/SD 100 "as illustrated". VBE/SD 100 may be used in a variety of orientations and configurations. Additionally, the apparatus disclosed herein is primarily described from the perspective of a viewer that is located proximate the back of the truck looking in the general direction of the tailgate of the vehicle. Different terms may be used to describe the apparatus if it is viewed from a different perspective.

Referring again to FIG. 11, in the illustrated stacked configuration, second panel 110 is stacked over first panel 105. As viewed, second panel 110 has a front margin and edge, a back margin and edge, a right margin and edge, and a left margin and edge. The front margin and edge lie closest to cab 15, and the back margin and edge lie farthest from cab 15. The back margin and edge of second panel 110 are rotatably connected with the back margin and edge of first panel 105 at first axis 120. A technique for rotatable connection may include one of the techniques described above in FIGS. 2–10 and the accompanying text.

Right panel 115R and left panel 115L, which are not visible in FIG. 11, are stacked relative to second panel 110. In the illustrated stacked configuration, right panel 115R and left panel 115L are both stacked over first panel 105 and stacked under second panel 110. One way right panel 115R and left panel 115L may be stacked relative to second panel 110 is described above with reference to FIGS. 8–10 and the accompanying text. Stacking right panel 115R and left panel 115L between first panel 105 and second panel 110 may potentially facilitate handling and use of VBE/SD 100. In one embodiment, the stacked panels (first panel 105, second panel 110, right panel 115R, and left panel 115L) have a thickness equivalent to the sum of the individual panels (i.e., stacked flat). It is appreciated that the particular stacking configuration is not required. In one or more alternate embodiments, right panel 115R and/or left panel 115L may also optionally be stacked on or over second panel 110.

Right panel 115R and left panel 115L each have a right margin and edge and a left margin and edge. The right margin and edge of left panel 115L is rotatably connected with the left margin of second panel 110 at left axis 125L. The left margin and edge of right panel 115R is rotatably connected with the right margin and edge of second panel 110 at right axis 125R.

Referring to FIG. 11, the front margin and edge of first panel 105 is placed near the hinged base of the tailgate between right sidewall 30R and left sidewall 30L of vehicle 10. The sidewalls of the vehicle include right post 60R and left post 60L against which the tailgate may seat when in the upright position. As will be explained further below, right post 60R and left post 60L may each be adapted to attach and potentially secure VBE/SD 100 to vehicle 10.

Various dimensions of VBE/SD 100 may typically be based at least in part on dimensions of vehicle 10. As shown in FIG. 11, a length of the front margin and/or edge of first panel 105 (the length $L_1$ shown in FIG. 1) may be substantially equal to the width of bed 25. As shown in FIG. 1, the front margin of first panel 105 may optionally have right squared corner 160R and left squared corner 160L. As revealed in FIG. 12, the front margin and/or edge of first panel may have a length dimension such that right squared corner 160R may optionally seat snugly against right sidewall post 60R or other portion of right sidewall 30R. Likewise, left squared corner 160L may optionally seat snugly against left sidewall post 60L or other portion of left sidewall 30L. However, such equal lengths are not required. In one embodiment, the length of the front margin and/or edge of first panel 105 is substantially equal to the width of bed 25 when they differ by not more than six inches. Embodiments are not limited to any known bed width. Further, as shown, the width of first panel 105 from the front edge to the back edge (the width $W_1$ shown in FIG. 1) may be slightly greater than the depth of the tailgate, although this is not required.

Figure 13:
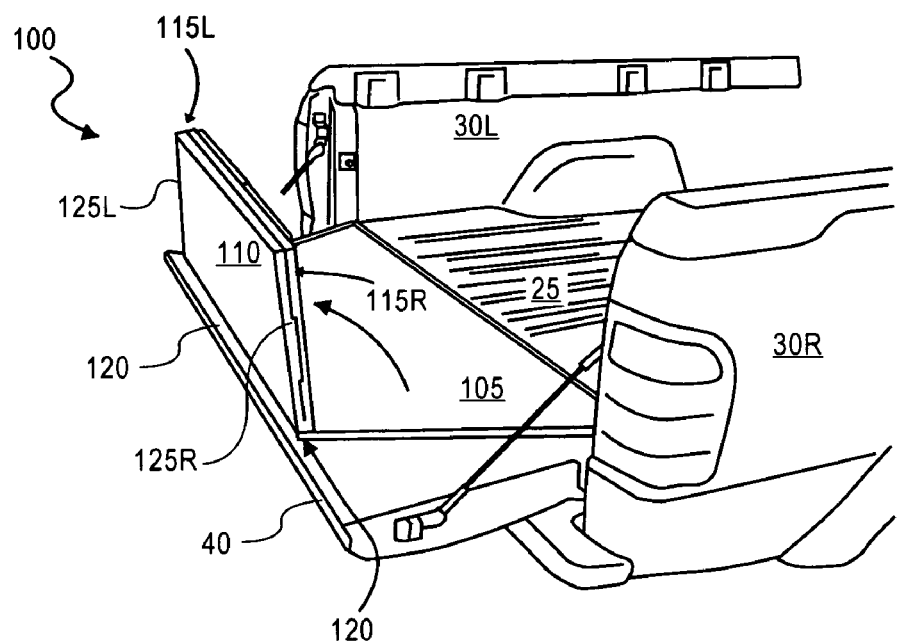
FIG. 13 shows the VBE/SD of FIG. 11 after rotating panels of the VBE/SD to a substantially vertical position relative to the tailgate of the vehicle.
Figure 14:
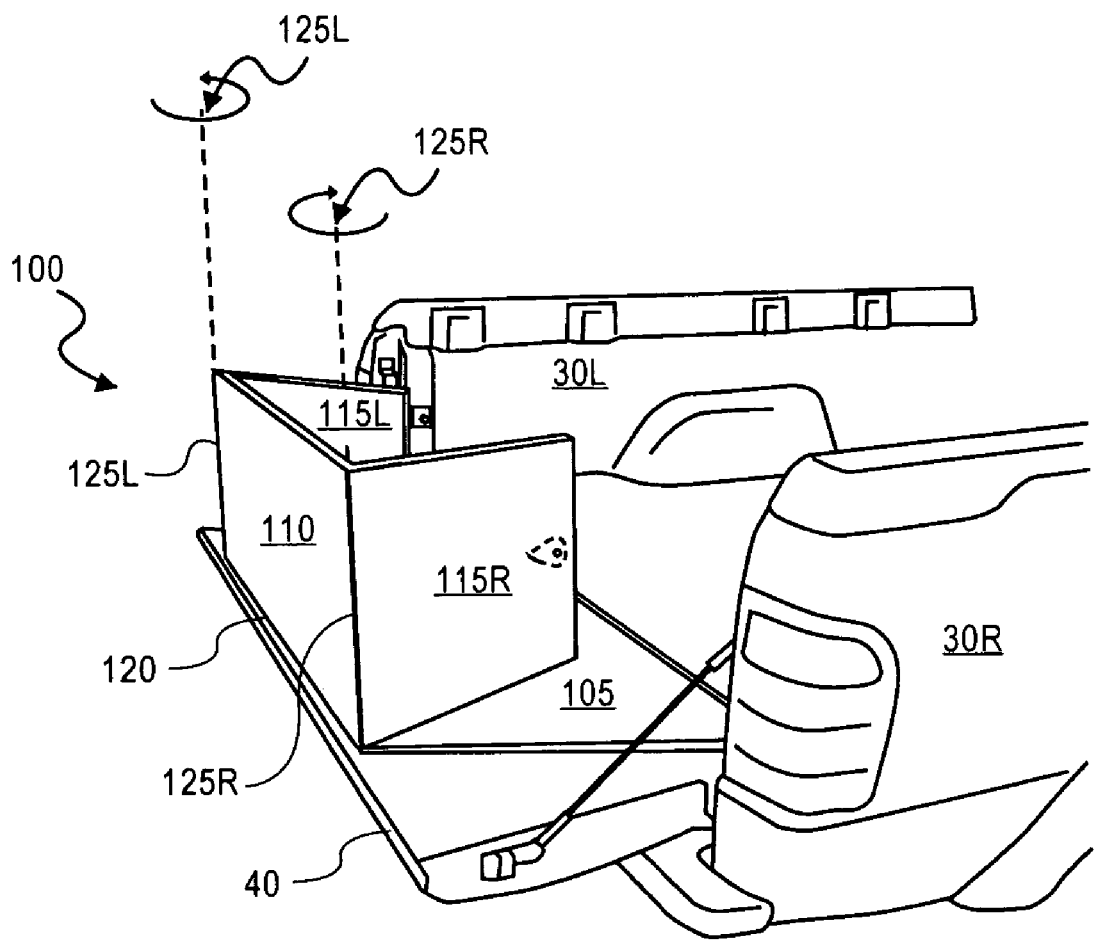
FIG. 14 shows the VBE/SD of FIG. 11 after rotating right and left panels toward the right and left sidewalls of the vehicle.
Figure 16:
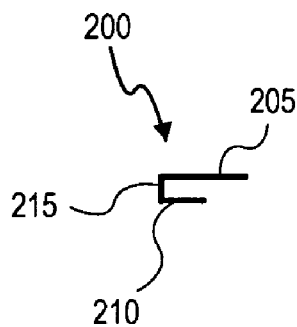
FIG. 16 is a top view of the bracket of FIG. 15.
Figure 17:
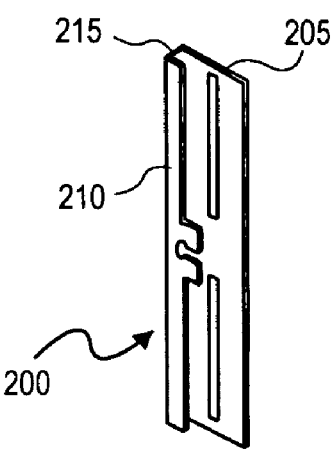
FIG. 17 is a top perspective view of the bracket of FIG. 15.
Figure 15:
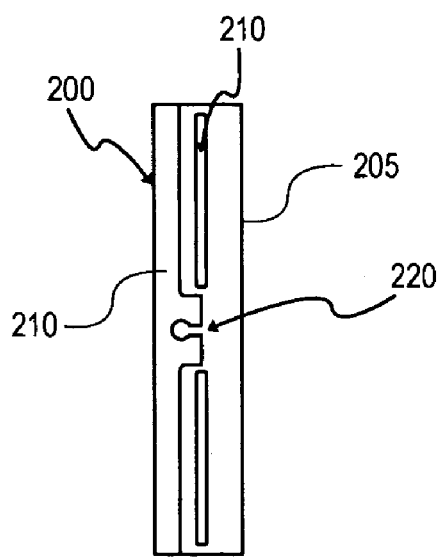
FIG. 15 shows a side view of an embodiment of a bracket that may be connected to a vehicle and used to connect a VBE/SD to the vehicle.

VBE/SD 100 may be converted from the stacked configuration into other useful configurations by rotating or otherwise moving the panels. FIGS. 13–14 show one embodiment of a method of converting VBE/SD 100 from the stacked configuration shown in FIG. 11 to the in-use vehicle bed extender configuration shown in FIG. 27.

FIG. 13 is a perspective view from the back right of the vehicle that shows VBE/SD 100 after rotating second panel 110 of the stacked configuration of FIG. 11 until it is substantially vertical. As used herein, a panel is substantially vertical when it has an angle of from 75 to 105° relative to horizontal. By way of example, a user who is standing at the back of vehicle 10 looking toward cab 15 may grab hold of the front margin of second panel 110 and pull second panel 110 backwards toward him/her. This may result in second panel 110 rotating about first axis 120. An arrow shows the direction of rotation of second panel 110. As second panel 110 is rotated to vertical, right panel 115R and left panel 115L, which in the view are folded in front of second panel 110, may also rotate to become substantially vertical.

FIG. 14 is a perspective view from the back right of the vehicle that shows VBE/SD 100 after rotating right panel 115R and left panel 115L away from second panel 110. Right panel 115R and left panel 115L may be rotated until they are proximate to and/or contact the respective right sidewall 30R and left sidewall 30L of vehicle 10. In one embodiment, the panels are proximate to the sidewalls when portions of the panels are within six inches or less of the sidewalls. By way of example, the user may grab hold of the top margin of left panel 115L, assuming left panel 115L is closer to the cab than right panel 115R, and may push or pull left panel 115L away from or toward him/her, respectively, so that left panel 115L may rotate about left axis 125L. The user may continue to rotate left panel 115L until right panel 115L contacts a portion of left sidewall 30L or until a desired position is reached approximately where a right edge of left panel 115L is adjacent left sidewall 30L. This same general process may be repeated for right panel 115R. Arrows show the directions of rotation of the panels. Depending in part upon the length of the back margin of second panel 110, the angle of rotation may range from about 90° to 150°, generally from about 105° to 135° from a position of right panel 115R and left panel 115L adjacent second panel 110. In the embodiment described above with respect to FIGS. 4–7, the angle of rotation may correspond with an angle that a ledge bends from an edge of second panel 110 (e.g., angle γ).

Figure 12:
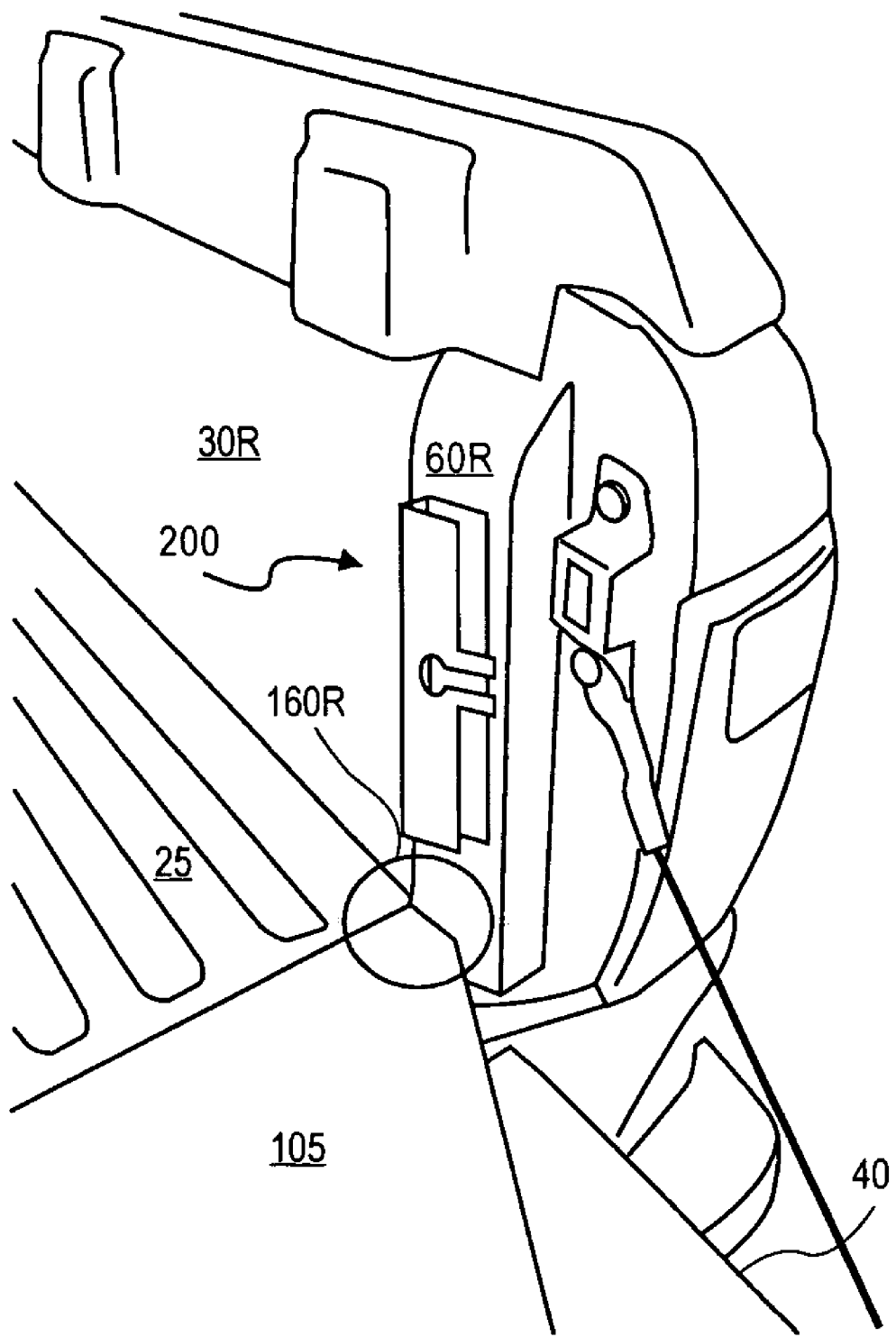
FIG. 12 shows a perspective magnified view of a right corner of the vehicle of FIG. 11 and shows a first panel aligned against a right sidewall post of the vehicle.

FIG. 12 is a close-up perspective view from the back right of vehicle 10 that shows an attachment bracket connected to right post 60R that may be used to attach and optionally secure right panel 115R to right sidewall 30R. A similar attachment bracket may be connected to left post 60L or left sidewall 30L. In one embodiment, right panel 115R and left panel 115L of VBE/SD 100 each include a mounting post that may connect with the bracket to provide attachment of VBE/SD 100 to vehicle 10. FIGS. 15–18 show different views of one embodiment of bracket 200. In this embodiment, bracket 200 includes a U-shaped body including longitudinal extending first arm 205 that, in FIG. 12, is connected to right post 60R of vehicle 10. First arm 205 of bracket 200 includes two longitudinally extending slots 210. Each slot may have a width sufficient to allow a fastener (e.g., screw) to be inserted therethrough to fasten bracket 200 to a post or other portion of a sidewall of a vehicle. A length of each slot 310 allows for positioning of bracket 200 relative to a fastener or fastening mechanisms. Bracket 200 may be screwed, bolted or otherwise attached to post 60R or other portion of right sidewall 30R. Other forms of attachment, such as, for example, welding, may also optionally be used.

Figure 18:
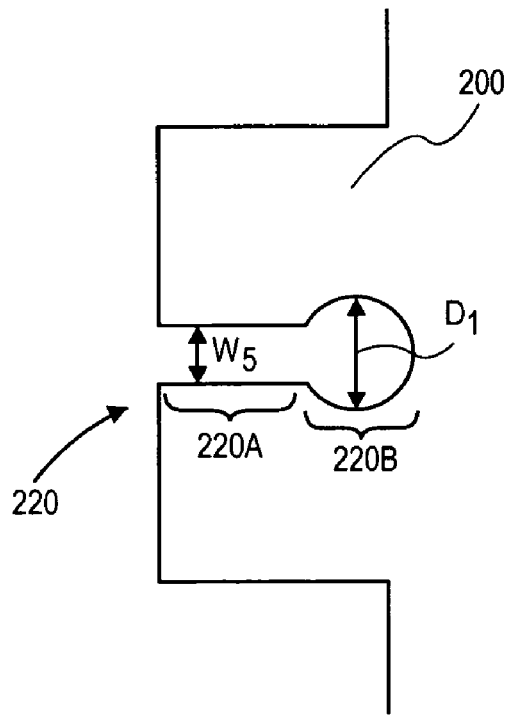
FIG. 18 is a magnified view of a keyhole slot of the bracket of FIG. 15.

Bracket 200 also includes longitudinally extending second arm 210. Second arm 210 is separated from first arm 205 by base 215 (see FIG. 16). Second arm 210 includes keyhole catch or slot 220 at approximately a midpoint thereof. Keyhole slot 220 is designed to attach or catch an extending post from right side panel 115R or left side panel 115L of VBE/SD 100 as will be described below. As shown in FIG. 18, in one embodiment, bracket 200 includes keyhole slot 220 with parallel portion 220A and reservoir (e.g., circular) portion 220B (see FIG. 15 and FIG. 17), the rectangular portion opening into reservoir portion 220B.

Figure 19:
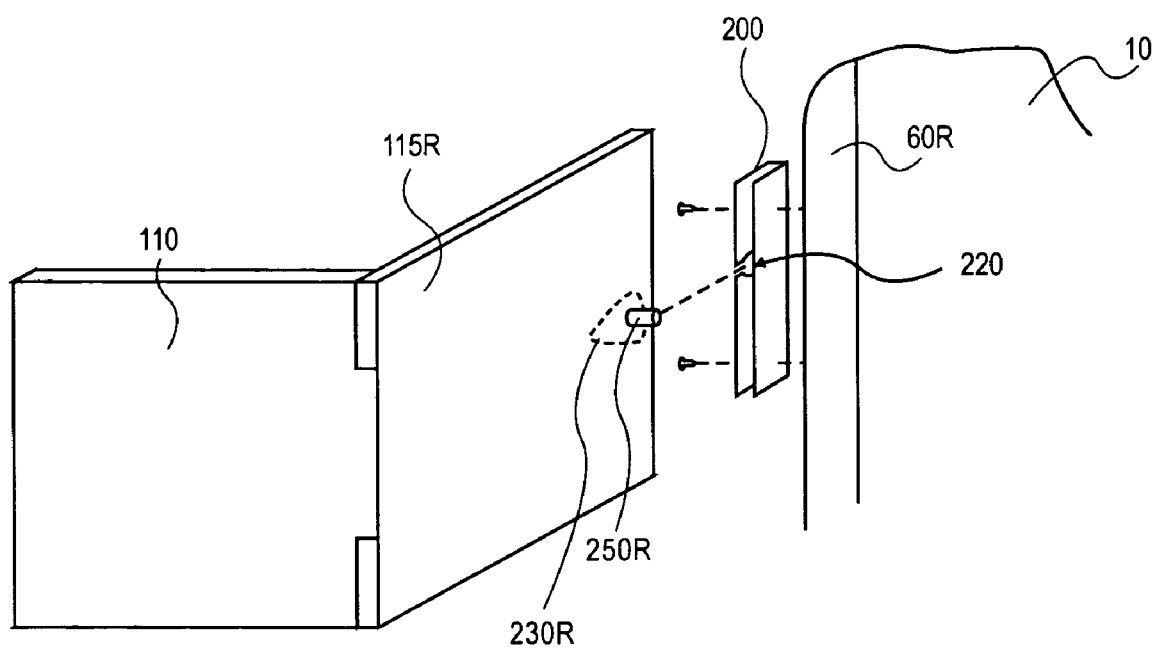
FIG. 19 is an exploded top perspective view of aligning an embodiment of a VBE/SD with a bracket connected to a vehicle.

FIG. 19 shows an embodiment of VBE/SD 100 including mounting post assembly 230R connected at a midpoint of right panel 115R. A similar mounting post assembly (assembly 230L) may be included on left panel 115L. FIG. 19 also shows right panel 115R extended from second panel 110 and approximately aligned on the back of vehicle 10 to mate with keyhole slot 220 of bracket 200. In one embodiment, mounting post assembly 230R includes post 250R that extends from right panel 115R so that, in a attachment configuration such as shown in FIG. 19, post 250R is approximately perpendicular or normal to a surface of a vertical surface of post 60R (or other portion of right sidewall 30R of vehicle 10).

FIG. 20 and FIG. 21 show representations of a mounting post assembly, such as mounting post assembly 230R. In one embodiment, mounting post assembly 230R include base 240R from which post 250R extends. Base 240R may be attached (e.g., by screws, rivets, etc.) to right panel 115R, for example, at a right margin or edge of right panel 115R so that post 250R extends from the panel. As viewed, post 250R extends from base 240R at an angle, α, less than 90 degrees and selected, in one embodiment, to be equivalent to the angle that right panel 115R extends away from post 60R (e.g., 15° to 45°). In this manner, when right panel 115R is angled from post 60R, post 250R will be presented as perpendicular to post 60R.

Figure 22:
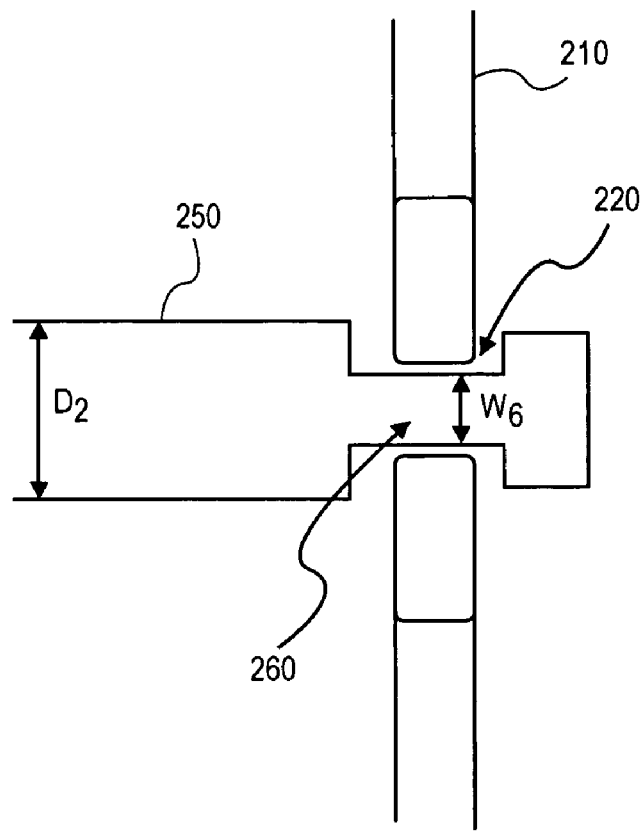
FIG. 22 is a magnified view of a portion of a mounting post aligned with a keyhole slot of the bracket of FIG. 15.
Figure 23:
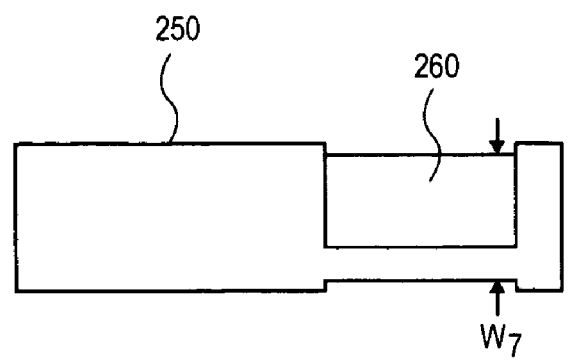
FIG. 23 shows the post of the mounting post assembly of FIG. 20 following the rotation of the post by less than one quarter turn.

FIG. 22 shows a magnified side view of post 250R aligned with keyhole slot 220 of bracket 200. In one embodiment, post 250R of mounting post assembly 230R is cylindrical along its length with flatted portion 260R at one point along its length. In one embodiment, flatted portion 260R of post 250R has a width dimension, $W_6$, less than a width, $W_5$, of parallel portion 220A of keyhole slot 220 of bracket 200 (see FIG. 18). This width may be on a single edge of post 250R. Rotating post 250R will increase the width of the post presented to keyhole slot 220 so that post will not fit within parallel portion 220A of keyhole slot 220. FIG. 23 shows post 250R after a rotation of less than a quarter turn. Flatted portion 260R now has a width, $W_7$, that is greater than a width, $W_3$ of parallel portion 220A of keyhole slot 220.

Referring to FIG. 18 and FIG. 22, reservoir portion 220B of keyhole slot 220 of bracket 200 has a diameter, $D_1$, that, in one embodiment, is less than or equal to a diameter, $D_2$, of post 250R but is greater than width, $W_5$, of parallel portion 220A. Thus, in one embodiment, post 250R may only be inserted or removed from keyhole slot 220 of bracket 200 by positioning flatted portion 260R with flatted sides parallel to the sidewalls of parallel portion 220A of keyhole slot 220 of bracket 200.

Figure 24:
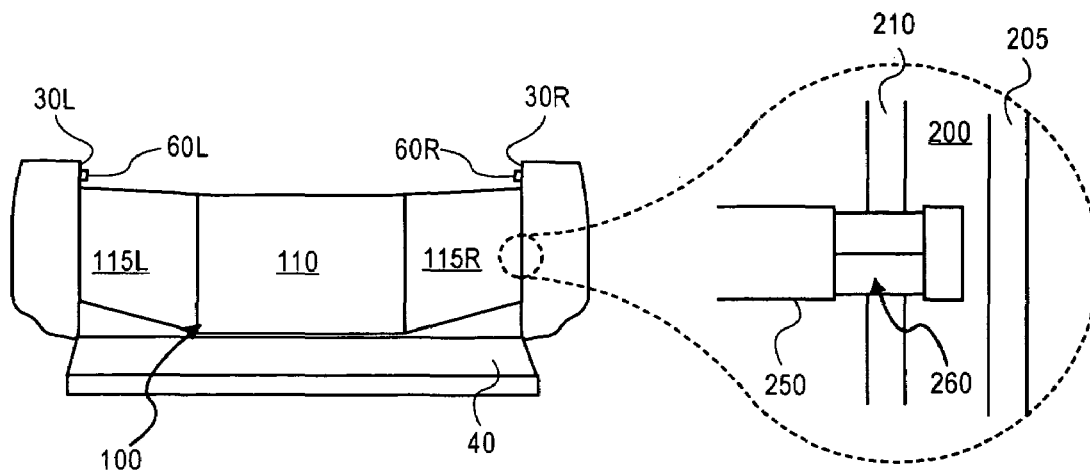
FIG. 24 shows a side view an embodiment of a VBE/SD positioned
Figure 25:
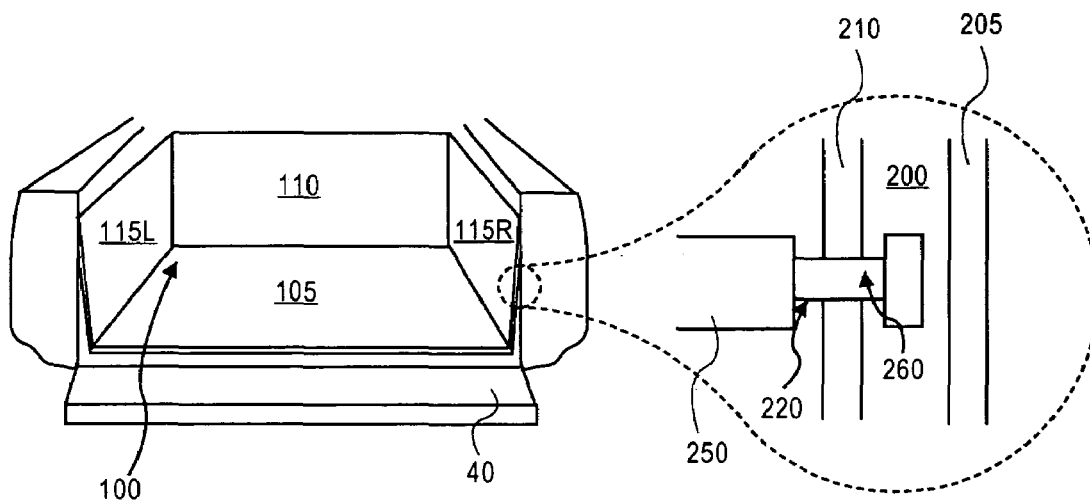
FIG. 25 shows the VBE/SD of FIG. 24 following the raising of the back panel away from the tailgate to rotate a mounting post to a width less than a width of a keyhole in the bracket connected to the vehicle.
Figure 26:
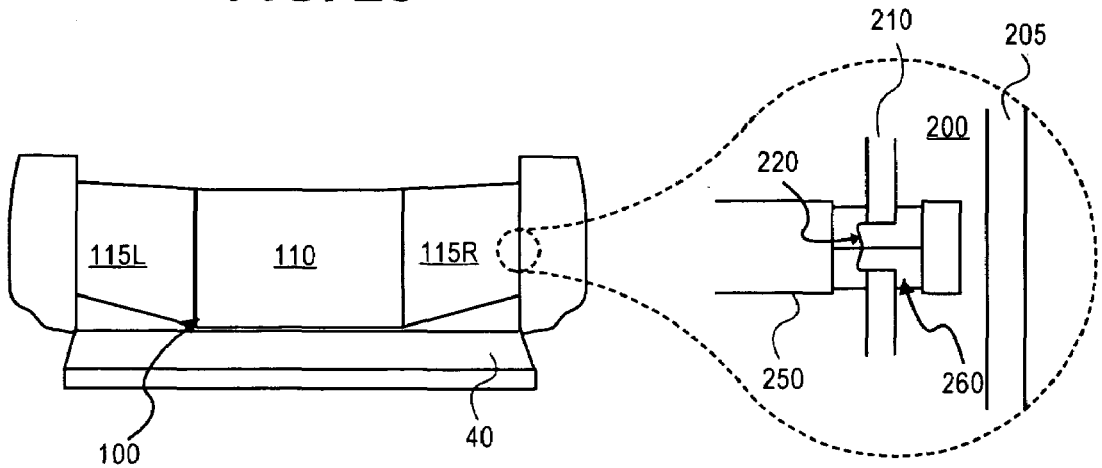
FIG. 26 shows the VBE/SD of FIG. 24 following the advancement of a mounting post on the VBE/SD into a keyhole slot of the bracket of the back panel back onto the tailgate of the vehicle.

FIGS. 24–26 show one technique for installing VBE/SD 100 as an in use vehicle bed extender on vehicle 10. FIG. 24 shows VBE/SD 100 with second panel 110 and right panel 115R and left panel 115L each in a vertical (as viewed) position on tailgate 40. In FIG. 24, VBE/SD 100 is seated on the tailgate so that an edge of each of second panel 110, right panel 115R and left panel 115L rest on tailgate 40 (in one embodiment, first panel is disposed between tailgate 40 and the other panels). A right margin and edge of right panel 115R and a left margin and edge of left panel 115L are behind or back from right sidewall post 60R or other portion of right sidewall 30R of vehicle 10. Likewise, left margin or edge or left panel 115L is behind or back from left sidewall post 60L or other portion of left sidewall 30L. A magnified view (inset) at right sidewall 30R of vehicle 10 shows post 250R extending from right panel 115R aligned with U-shaped bracket 200 so that flatted portion 260R is positioned behind keyhole slot 220 of bracket 200. As viewed in this embodiment, flatted portion 260R has a width dimension, $W_5$, greater than a width of keyhole slot 220 (not shown). Thus, flatted portion 260R cannot slide within keyhole slot 220 of bracket 200.

FIG. 25 shows VBE/SD 100 after lifting second panel 110 from tailgate 40 of vehicle 10 while leaving a right edge of right panel 115R and a left edge of left panel 115L approximately in contact with tailgate 40 or a bed of the truck. In other words, second panel 110 is rotated towards a cab of vehicle 10. In this embodiment, VBE/SD 100 is rotated until flatted portion 260R is aligned with width $W_4$ in planar alignment with the opening of keyhole slot 220 in bracket 200. This is shown in the exploded inset in FIG. 25. Once flatted portion 260R is planarly aligned with keyhole slot 220, VBE/SD 100 may be pushed toward the cab of vehicle 10 with flatted portion 260R of post 250R advancing into keyhole slot 220 (into parallel portion 220A) toward reservoir portion 220B.

FIG. 26 shows post 250R of right panel 115R of VBE/SD 100 advanced into a reservoir of keyhole slot 220. Once flatted portion 260R is advanced into reservoir portion 220B of keyhole slot 220, VBE/SD 100 may be rotated back toward tailgate 40 so that an edge of second panel 110 rests on tailgate 40 (perhaps separated from tailgate 40 by first panel 105). An inset of FIG. 26 shows flatted portion 260R within reservoir portion 220B of keyhole slot 220 and captured within reservoir portion 220B of keyhole slot 220 of bracket 200. It is appreciated that left panel 115L may be attached to vehicle 10 in a similar fashion as right panel 115R.

A post/bracket system for connecting VBE/SD is described. It is appreciated that other attachment mechanisms may alternatively be employed. For example, a post (male member) may extend from each of right sidewall 30R and left sidewall 30L of vehicle 10. Openings (female member) may be formed in right panel 115R and left panel 115L that mate with the extending posts so that the posts extend through the openings. Right panel 115R and left panel 115L may optionally be secured relative to the sidewalls of vehicle 10. For example, a shackle may be introduced through a hole in the male member and then secured by a shackle locking mechanism at a position within a volume defined by VBE/SD 100.

Figure 27:
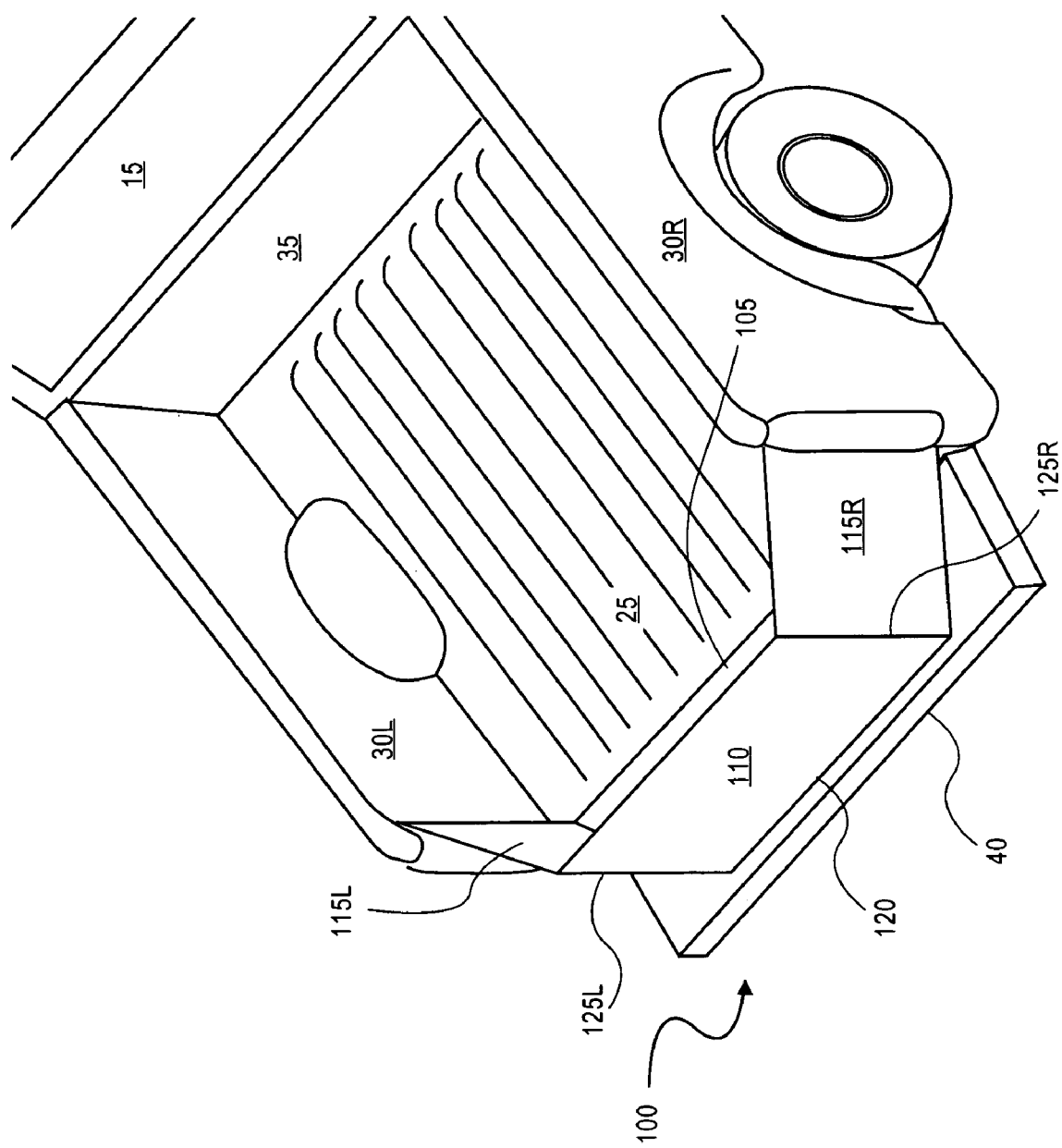
FIG. 27 shows a VBE/SD in an in-use vehicle bed extender configuration, according to one or more embodiments of the invention.

FIG. 27 is a perspective view from the back right of the vehicle that shows VBE/SD 100 in an in-use vehicle bed extender configuration. In the vehicle bed extender configuration, first panel 105 serves as a base, second panel 110 serves as a back, and right panel 115R and left panel 115L serve as respective right and left sides. The panels cooperate to define a structure that may define a perimeter around an extended bed and/or cargo area of vehicle 10. When in use in the vehicle bed extender configuration, VBE/SD 100 may help to hold items in the cargo area while the vehicle is moving and stopping. As shown, the vertical height of each of second panel 110, right panel 115R, and left panel 115L (the width $W_2$ shown in FIG. 1) may be substantially equal to the height of the sidewalls. They are substantially equal when they are, for example, within at least six inches.

One reason for the optional trapezoidal shape of first panel 105 and shorter second panel 110 (the length $L_2$ shown in FIG. 1) is now revealed in this view. As shown, shorter second panel 110 and trapezoidal first panel 105 tend to promote visibility of the tail and brake lights, which are located at the ends of right sidewall 30R and left sidewall 30L. In addition to promoting visibility, the dimensions be such that they comply with applicable vehicular regulations. However, it is noted that vehicular regulations may not exist in all jurisdictions in which the apparatus may be used and the trapezoidal shape of first panel 105 and shorter second panel 110 are accordingly optional features.

Figure 28:
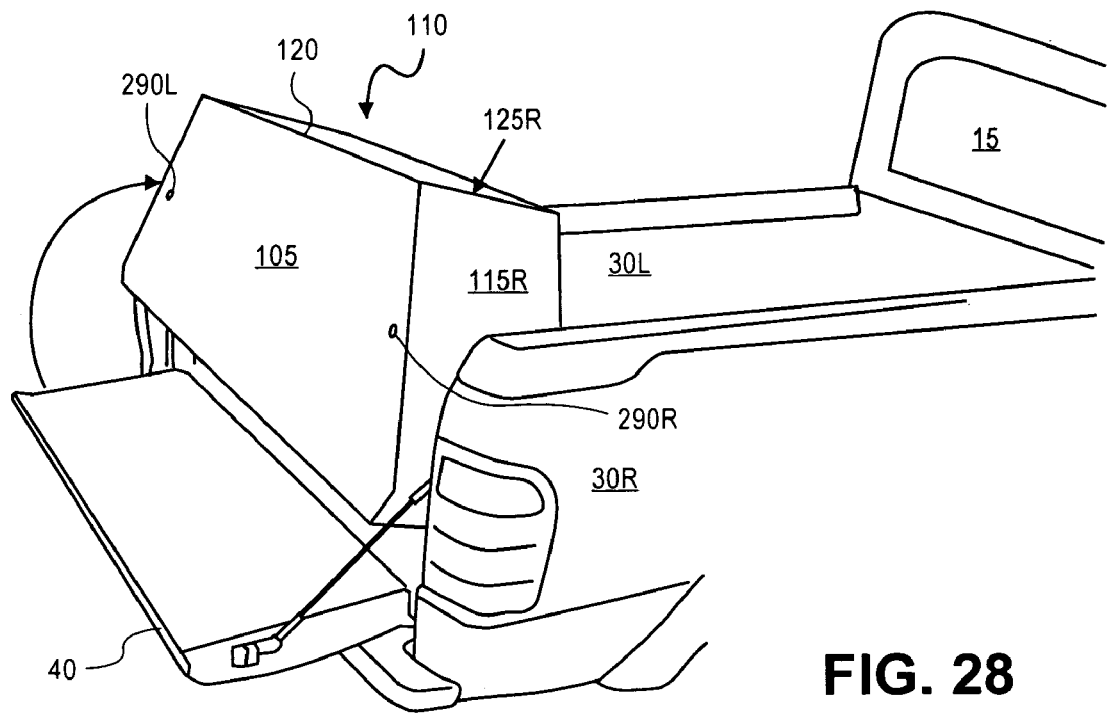
FIG. 28 shows how the VBE/SD may be transitioned from a vehicle bed extender configuration to a storage device configuration, according to one or more embodiments of the invention.
Figure 30:
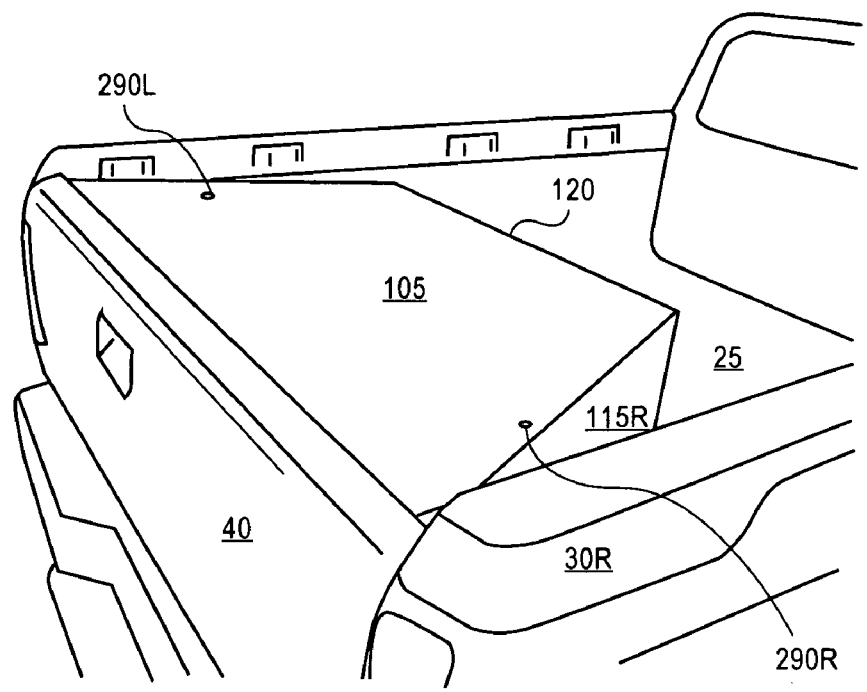
FIG. 30 shows the VBE/SD in the storage device configuration with the tailgate in the upright position, according to one or more embodiments of the invention.

FIG. 28 is a perspective view from the back right of the vehicle that shows how VBE/SD 100 may be transitioned from the vehicle bed extender configuration of FIG. 27 to a storage device configuration like that shown in FIG. 30. As shown in the illustrated embodiment, the vehicle bed extender configuration may be rotated from off tailgate 40 toward cab 15 of vehicle 10. By way of example, a user may grab hold of VBE/SD 100, such as, for example, by grabbing hold of the bottom margin of second panel 110, and may then lift VBE/SD 100 initially up off of tailgate 40, and may then begin to push VBE/SD 100 forward toward cab 15 of the vehicle. In one embodiment, this may cause or at least result in the vehicle bed extender rotating about an axis defined by connections of VBE/SD 100 with vehicle 10, such as, for example, the axis defined by the connection of posts on right panel 115R and left panel 115L to respective brackets on vehicle 10. The axis of rotation is generally transverse to the bed and parallel to the cab. An arrow is used to show the direction of rotation. In the illustration, VBE/SD 100 has been rotated by about 90° to a transitory position about halfway between the vehicle bed extender configuration and the storage device configuration. Further rotation by about another 90° may result in displacement of VBE/SD 100 into the region fully enclosed by the tailgate such that second panel 110 becomes vertical and is supported by bed 25, at which point further rotation may stop.

As shown in FIG. 1, depending at least in part on the materials used for the panels, edge protectors 155 may optionally be included on some or all of the edges of the panels. By way of example, the edge protectors may include frames made of a plastic, rubber, or other relative soft and non-scratching material. When metal panels are used, the edge protectors may help to reduce scratching of the paint and other damage to the vehicle. Plastic and wood panels tend to scratch less than metal panels, although the protectors may also optionally be used with these types of panels.

Figure 29:
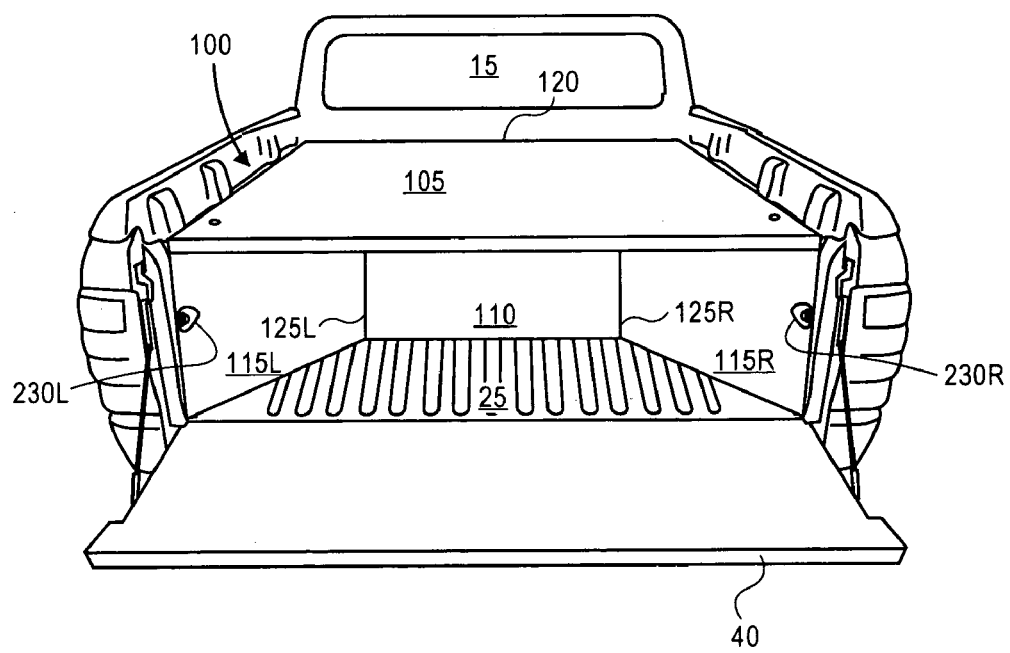
FIG. 29 shows the VBE/SD in a storage device configuration, according to one or more embodiments of the invention.

FIG. 29 is a perspective view from the back of the vehicle that shows VBE/SD 100 in a storage device configuration, according to one embodiment. In the storage device configuration, first panel 105 is the top, second panel 110 is in the front nearest to the cab, and right panel 115R and left panel 115L are the respective right and left sides. The panels cooperate to define an enclosure having an open end that faces away from the cab toward the tailgate. The open end may have a size and shape that correspond to the size and shape of the tailgate.

FIG. 30 is a perspective view from the back right of the vehicle that shows VBE/SD 100 in the storage device configuration shown in FIG. 29 after closing tailgate 40. As shown, the open end may be sized and shaped similarly to the tailgate in order that the tailgate may close off the open end when it is in the upright position.

Figure 31:
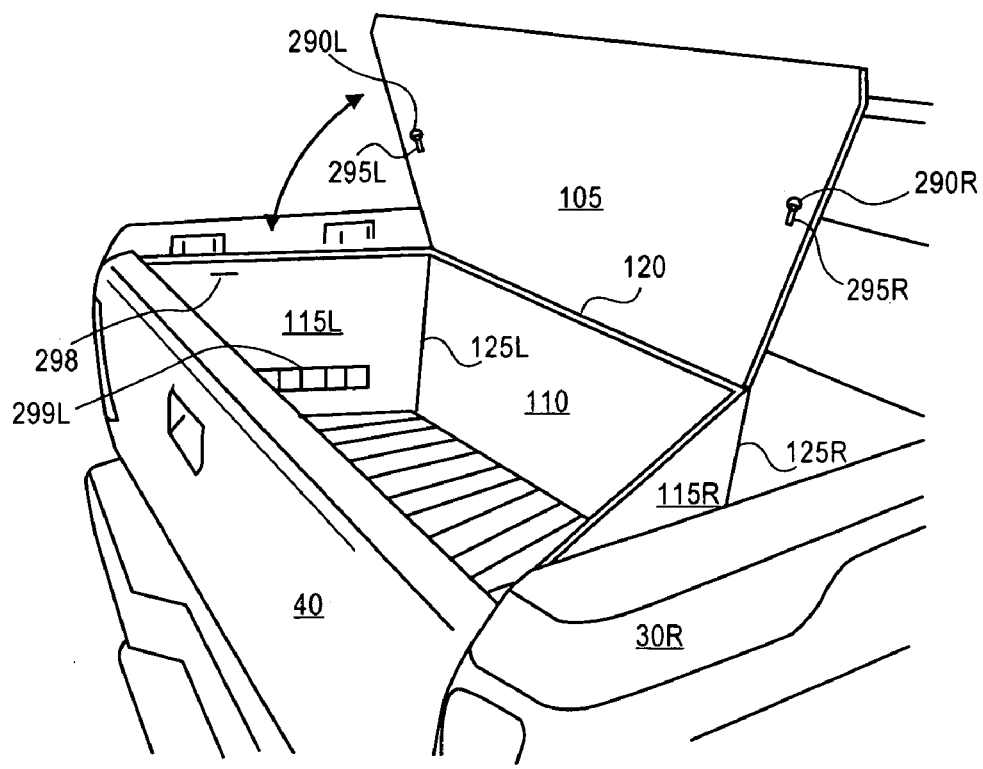
FIG. 31 shows the VBE/SD in a storage device configuration with the first panel rotated upward away from the tailgate, according to one or more embodiments of the invention.

FIG. 31 is perspective view from the back right of the vehicle that shows VBE/SD 100 in a storage device configuration and shows that first panel 105 may optionally be rotated upward away from tailgate 40 in order to provide access to the inside of the storage device configuration. First panel 105 may be rotationally connected with second panel 110 in, for example, one of the ways described above and may optionally serve as a lid that may be opened and closed to place and/or remove items from the storage device. As shown, in FIG. 30 and FIG. 31, the lid may optionally include locking device 290R and locking device 290L to allow first panel 105 to be locked. In one embodiment, a locking device may lock first panel 105 relative to right panel 115R and left panel 115L to prevent upward rotation of first panel 105. FIG. 31 shows locking device 290L having a rectangular body 295L that extends from an underside and parallel to first panel 105. Rotation of a key in lock 290R (the keyhole slot extending from a top side of first panel 105) rotates the rectangular body into a corresponding slot 298L in left panel 115L. In one embodiment, the slot has a dimension (e.g., width) greater than a thickness of rectangular body 295L. FIG. 30 and FIG. 31 also show lock 290R that may have a similar assembly, configuration and operation.

It is appreciated that in embodiments VBE/SDs such as VBE/SD are not limited to first panel 105 being rotationally connected to second panel 110 in the storage device configuration or to first panel 105 being used as a lid. Items may also optionally be exchanged with the storage device by opening the tailgate. In one embodiment, one or more panels may include a rack or shelf on an interior or exterior side thereof. The rack or shelf may serve to support items. FIG. 31 shows rack 299L on a surface of left panel 115L, a surface that defines the interior volume of the storage device. Where left panel 115L is made of a molded plastic material, rack 299L may be formed as an integral part of the panel, e.g., incorporated in the mold of the panel. Racks, shelves, hooks, etc. may be on either the interior or exterior volume of VBE/SD 100 in either the bed extended or storage device configurations.

It will be appreciated by those skilled in the art, that the methods described above may be substantially reversed in order to transition the VBE/SD from the storage device configuration to the vehicle bed extender configuration, and then to the stacked configuration. For brevity, the reverse procedures will not be described in further detail.

As previously described, the stacked configuration generally has a compact form that may facilitate handling, storage, and shipping. In one embodiment, the stacked configuration may be placed in a confined space in cab 15 of vehicle 10, such as, for example, behind the seats.

Figure 32:
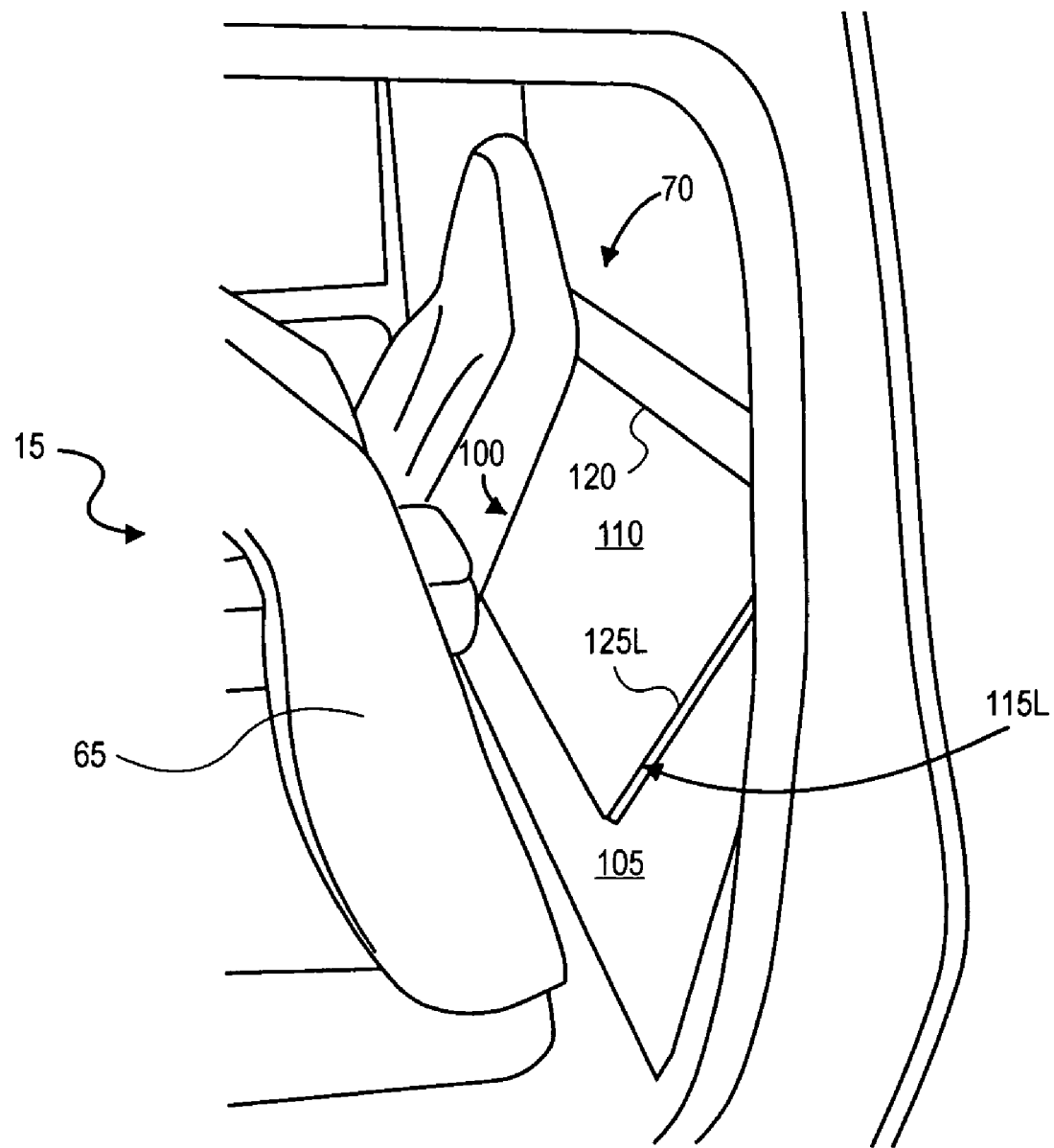
FIG. 32 shows the stacked configuration of the VBE/SD stored in the cab in the space behind the seats, according to one or more embodiments of the invention.

FIG. 32 is a perspective view from the left, driver side of the vehicle looking into cab 15 that shows the stacked configuration of VBE/SD 100 stored in cab 15 in the space behind seats 65. As illustrated, first panel 105, second panel 110, right panel 115R, and left panel 115L are stacked one on top of the other so that adjacent panels contact one another. In one embodiment where a VBE/SD is connected to a vehicle using a post/bracket system, posts may protrude from a surface of, for example, left and right panels. This is illustrated in FIGS. 8–10 where posts 250 extend from a right side of right panel 115R and a left side of left panel 115L. In the embodiment described with reference to FIGS. 8–10, utilizing a post/bracket system, VBE/SD 100 is designed such that left panel 115L rotates onto right panel 115R in achieving the stacked configuration shown in FIG. 10. In such case, left panel 115L may include dimple or recess 275 in its body at a point where a post from the right panel would otherwise contact the left panel 115L. Dimple or recess 275 is of a size (depth) to a accommodate post 250 in such a manner that left panel 115L and right panel 115R may be stacked so as to have surfaces in contact with one another.

By way of example of stacking the panels of a VBE/SD, a user may grab hold of the stacked configuration and place, slide, or otherwise introduce the stacked configuration into cab 15 and into the space behind seats 65. Typically, the stacked configuration may be introduced in a substantially upright or vertical position with the long edge of the first panel traversing cab 15. In the illustrated embodiment, first axis 120 that rotationally connects first panel 105 with second panel 110 is on top, although this is not required. A reverse orientation is also suitable. Also, in the illustrated embodiment, second panel 110 is in front of first panel 105 and closer to seats 65, although this also is not required. First panel 105 may also optionally be placed in front of second panel 110. In any event, the thickness of the stacked panels may be disposed between the seats and the back of the cab. The amount of space generally tends to be limited. In some vehicles, the distance between the seats and the back of the cab may be less than twelve inches, less than six inches, or less. In various embodiments of the invention, in order to facilitate storage, the stacked configuration may have a thickness that is not greater than about twelve inches, not greater than about six inches, not greater than about two inches, or not greater than about one inch.

Figure 33:
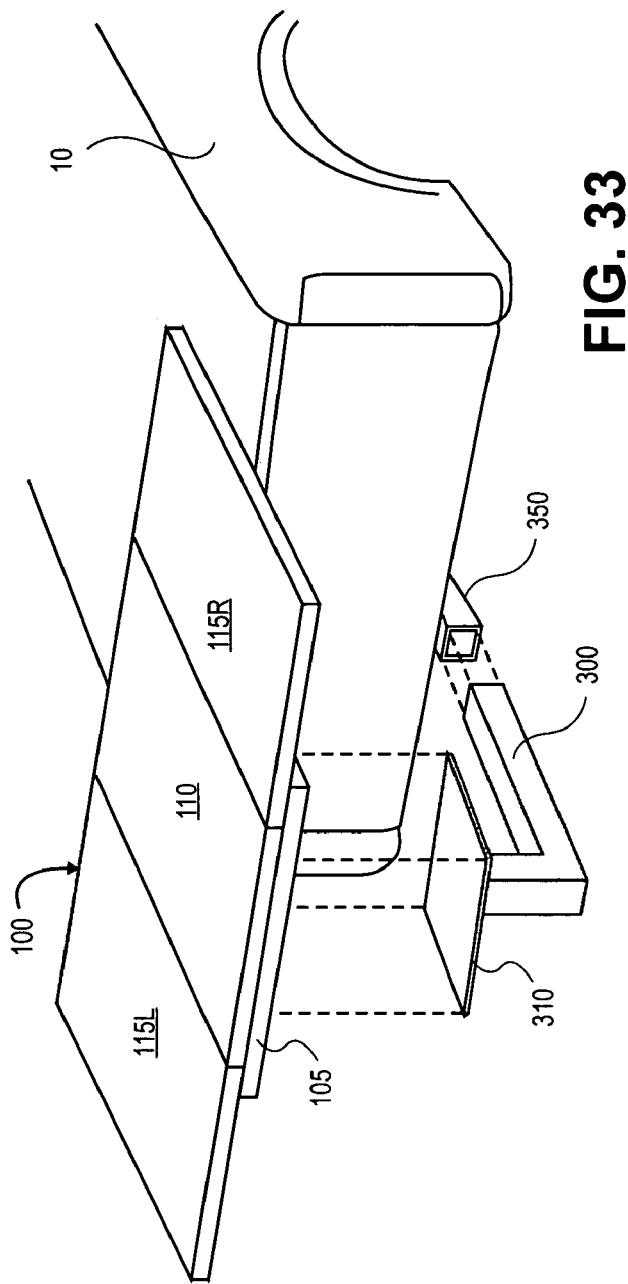
FIG. 33 shows a perspective view of an embodiment of VBE/SD assembled in a generally planar arrangement for use as a table top and assembled on an L-bracket that may be connected to a trailer hitch.
Figure 34:
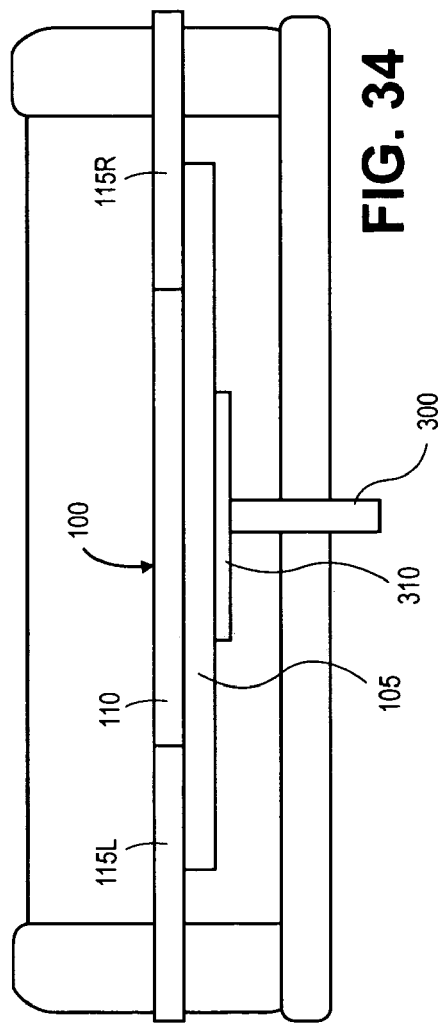
FIG. 34 shows a side perspective view of the VBE/SD of FIG. 33 as a table top.

FIG. 33 and FIG. 34 show another configuration for a VBE/SD. In this embodiment, VBE/SD may serve as a table top, for example, at a construction site or picnic/camping site. In this embodiment, VBE/SD 100 is configured so that right panel 155R, and left panel 115L are planarly aligned with second panel 110. Second panel 110 also is stacked on first panel 105. First panel 105, in an embodiment wherein first panel 105 is larger than second panel 110, also supports a portion of right panel 115R and left panel 115L. In one embodiment, VBE/SD may be laid flat on the ground or over legs or platform and serve as a table top. In another embodiment, as illustrated in FIG. 33 and FIG. 34, an L-shaped bracket is provided. The L-shaped bracket connects with trailer hitch sleeve 350 of vehicle 10, for example, by having a rectangular dimension that is less than a rectangular dimension of trailer hitch sleeve 350. L-shaped bracket 300 may have an arm that extends a length away from vehicle 10, such as a length equal to at least half the width, $W_1$, of first panel 105 (see FIG. 1). A base of L-shaped bracket 300 extends vertically relative to trailer hitch sleeve 350 to support VBE/SD 100. First panel 105 of VBE/SD may be formed so that it has a depression or slot into which a base of L-shaped bracket 300 may be positioned. Alternatively, L-shaped bracket 300 may optionally include receiving plate 310 at its end. Receiving plate 310 may be of a size sufficient to support and balance VBE/SD 100 when VBE/SD 100 is positioned on L-shaped bracket. This configuration illustrates that the stacked or flat folding nature of the individual panels of a VBE/SD provides different configurations for different uses.

Embodiments have been illustrated by showing VBE/SD 100 configured relative to vehicle 10. However, the vehicle itself typically forms no part of the described embodiments. One notable exception is an embodiment in which a VBE/SD as disclosed herein is factory installed in a vehicle.

While several embodiments are described, those skilled in the art will recognize that the spirit and scope of the claims are not limited to the embodiments described, but can be practiced with modification and alteration. The description is thus to be regarded as illustrative instead of limiting.

What is claimed is:

1. An apparatus comprising:
    a first panel configured to lay horizontally over a tailgate of a vehicle when the tailgate is in an extended position, the first panel having a front margin to lie closer to a cab of the vehicle and a back margin to lie farther from the cab;
    a second panel stacked over the first panel, the second panel having a front margin, a back margin, a right margin, and a left margin, the back margin of the second panel being rotatably coupled with the back margin of the first panel;
    a left panel stacked relative to the second panel, the left panel having a right margin and a left margin, the right margin of the left panel being rotatably coupled with the left margin of the second panel; and
    a right panel stacked relative to the second panel, the right panel having a right margin and a left margin, the left margin of the right panel being rotatably coupled with the right margin of the second panel,
    wherein the right panel and the left panel are stacked under the second panel, wherein a surface of the second panel defines a plane and an axis of rotation of the left panel about the second panel is offset from the plane and an axis of rotation of the right panel about the second panel is offset from the plane and wherein the offset of the left panel is different from the offset of the right panel.

2. An apparatus comprising:

a first panel configured to lay horizontally over a tailgate of a vehicle when the tailgate is in an extended position, the first panel having a front margin to lie closer to a cab of the vehicle and a back margin to lie farther from the cab;

a second panel stacked over the first panel, the second panel having a front margin, a back margin, a right margin, and a left margin, the back margin of the second panel being rotatable coupled with the back margin of the first panel;

a left panel stacked relative to the second panel, the left panel having a right margin and a left margin, the right margin of the left panel being rotatably coupled with the left margin of the second panel; and a right panel stacked relative to the second panel, the right panel having a right margin and a left margin, the left margin of the right panel being rotatably coupled with the right margin of the second panel, wherein each of the left panel and the right panel comprises a post extending from a side thereof, wherein a protrusion of a post on one of the left panel and the right panel extends into a plane defined by a body of the other of the left panel and the right panel when the left panel and the right panel are stacked relative to the second panel.

* * * * *

UNITED STATES PATENT AND TRADEMARK OFFICE
CERTIFICATE OF CORRECTION

| | |
|---|---|
| PATENT NO. | : 7,226,100 B1 |
| APPLICATION NO. | : 11/169400 |
| DATED | : June 5, 2007 |
| INVENTOR(S) | : Willey et al. |

Page 1 of 1

It is certified that error appears in the above-identified patent and that said Letters Patent is hereby corrected as shown below:

Title page, in Item [56], line 7, under U.S. Patent Documents, Patent number: 4,750,733, please delete "6/1988" and insert -- 7/1988 --.

Title Page, in Item [56], under U.S. Patent Documents, Patent number: 6,425,618, please delete "7/2002" and insert -- 6/2002 --

Signed and Sealed this

Twenty-ninth Day of July, 2008

JON W. DUDAS
*Director of the United States Patent and Trademark Office*